United States Patent
Lim et al.

(10) Patent No.: US 12,516,196 B2
(45) Date of Patent: Jan. 6, 2026

(54) CNT FILM COATED SUBSTRATE USING CLICK REACTION AND MANUFACTURING METHOD THEREOF

(71) Applicant: Korea Research Institute of Chemical Technology, Daejeon (KR)

(72) Inventors: Bogyu Lim, Daejeon (KR); Seo Hyun Jung, Daejeon (KR); Yu Jin Jung, Daejeon (KR); Jong Mok Park, Daejeon (KR); Ho Youl Kong, Daejeon (KR); Suyeol Yoon, Daejeon (KR); Ye Jin Kim, Daejeon (KR); Ga Young Kim, Daejeon (KR); Kwang Hun Park, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 908 days.

(21) Appl. No.: 17/655,698

(22) Filed: Mar. 21, 2022

(65) Prior Publication Data
US 2022/0340761 A1   Oct. 27, 2022

(30) Foreign Application Priority Data
Apr. 19, 2021   (KR) .......................... 10-2021-0050714

(51) Int. Cl.
*C09D 1/00* (2006.01)
*B05D 1/18* (2006.01)
(Continued)

(52) U.S. Cl.
CPC ................. *C09D 1/00* (2013.01); *B05D 1/18* (2013.01); *B05D 3/002* (2013.01); *C01B 32/168* (2017.08);
(Continued)

(58) Field of Classification Search
CPC .......... C09D 1/00; C09D 139/00; B05D 1/18; B05D 3/002; B05D 2201/02; C01B 32/168; C08K 3/041; B82Y 40/00
See application file for complete search history.

(56) References Cited

U.S. PATENT DOCUMENTS

| | | | | |
|---|---|---|---|---|
| 2013/0133825 | A1* | 5/2013 | Hattori | B81C 1/00031 156/272.2 |
| 2014/0066631 | A1* | 3/2014 | Kwon | C07D 249/04 548/255 |

FOREIGN PATENT DOCUMENTS

| | | | |
|---|---|---|---|
| KR | 20040030553 A | 4/2004 | |
| KR | 20070051979 A | 5/2007 | |

(Continued)

OTHER PUBLICATIONS

Adronov et al., Functionalization of polyfl uorene-wrapped carbon nanotubes via copper-mediated azide-alkyne cycloaddition; Polym. Chem., 2018, 9, 2873.*

(Continued)

*Primary Examiner* — James M Mellott
(74) *Attorney, Agent, or Firm* — Hauptman Ham, LLP

(57) ABSTRACT

Provided is a CNT film coated substrate in which CNT is fixed to a substrate using a click reaction, so that a CNT film is uniformly formed with a high density and adhesive strength between the CNT film and the substrate is excellent to have high stability to water or an organic solvent. In the case of the conventional CNT film which was manufactured by spin coating, most of CNT was peeled off in a washing process, but in the case of the CNT film coated substrate according to the present invention, a high-density uniform CNT film coated substrate may be manufactured even after washing, and reproducibility between substrates may be secured.

9 Claims, 9 Drawing Sheets

(51) Int. Cl.
  *B05D 3/00* (2006.01)
  *B82Y 40/00* (2011.01)
  *C01B 32/168* (2017.01)
  *C08K 3/04* (2006.01)
  *C09D 139/00* (2006.01)

(52) U.S. Cl.
  CPC ............ *C08K 3/041* (2017.05); *C09D 139/00* (2013.01); *B05D 2201/02* (2013.01); *B82Y 40/00* (2013.01)

(56) References Cited

FOREIGN PATENT DOCUMENTS

| KR | 100869163 B1 | 11/2008 |
| KR | 10-2013-0054982 A | 5/2013 |
| KR | 10-2014-0033555 A | 3/2014 |

OTHER PUBLICATIONS

Yoon, S. et al., "Fabrication of CNT Films with High Density and Stability by Click Reaction," Proceedings of the 2021 Polymer Society of Korea Annual Spring Meeting, Apr. 7, 2021, Daejeon, South Korea, 151 pages. (Submitted with English Abstract).

Korean Decision to Grant Patent dated Jan. 3, 2023 for corresponding Korean patent application No. 10-2021-0050714, 5 pages.

Office Action issued on Aug. 29, 2022, for corresponding Korean Patent Application No. 10-2021-0050714 along with an English machine translation (14 pages).

Darryl Fong et al., "Functionalization of polyfluorene-wrapped carbon nanotubes via copper-mediated azide-alkyne cycloaddition", Polymer Chemistry, Jun. 7, 2018, vol. 9, No. 21, pp. 2873-2879, cited in NPL No. 1.

\* cited by examiner

CNT FILM COATED SUBSTRATE USING CLICK REACTION AND MANUFACTURING METHOD THEREOF

CROSS REFERENCE TO RELATED APPLICATION

The present application claims priority to Korean Patent Application No. 10-2021-0050714 filed on Apr. 19, 2021. The entire contents of the above-listed application are hereby incorporated by reference for all purposes.

TECHNICAL FIELD

The following disclosure relates to a CNT film coated substrate using a click reaction, and more particularly, to a substrate which is coated with a high-density CNT film having high stability to water or an organic solvent by using a click reaction to apply a CNT film, and a manufacturing method thereof.

BACKGROUND

A carbon nanotube (hereinafter, referred to as CNT) is a material in which one carbon is bonded to another carbon atom in a hexagonal honeycomb pattern to form a tube form, and has excellent mechanical properties and electrical conductivity. Thus, CNT is applied as a conductive material of a semiconductor device, a flexible display, a solar cell, and the like, and for this, various methods for applying CNT at a high density on a base material without impairing electrical properties of CNT are being attempted.

In Korean Patent Laid-Open Publication No. KR 10-2004-0030553 A, CNT having an outer diameter of 3.5 nm is used to manufacture a coating film, but since dispersibility of CNT is poor and adhesive strength with a base material is deteriorated, a CNT film is easily peeled off in a washing process.

In order to solve the problem, a spray coating method, a spin coating method, and the like of a CNT dispersion using a surfactant were attempted, but problems such as a residual surfactant, CNT density, and poor adhesive strength between a base material and CNT occurred. In addition, in Korean Patent Laid-Open Publication No. KR 10-2007-0051979 A, a CNT dispersion having a carboxyl group formed is repeatedly applied on a base material having an amine group exposed to manufacture a high-purity and high-density CNT film, but there are still some problems in that since film uniformity is poor, reproducibility is low and a manufacturing process is complicated.

In Korean Patent Publication No. KR 10-0869163 B1, a transparent conductive film is manufactured with a one-component CNT/binder mixed coating solution to secure the physicochemical stability of a CNT transparent electrode, process ease, and interfacial adhesion strength, but when a critical binder content is exceeded, CNT gets stuck inside the binder so that sheet resistance is rapidly increased, and thus, there are limitations in manufacturing a high-density CNT film.

Therefore, research and development of a high-density CNT film coated substrate which has good adhesive strength with a base material, has excellent reproducibility between devices due to the uniform CNT film, and has good stability to water or an organic solvent while maintaining the electrical properties of CNT is desperately demanded.

RELATED ART DOCUMENTS

Patent Documents

Patent Document 1: KR 10-2004-0030553 A (Apr. 9, 2004)
Patent Document 2: KR 10-2007-0051979 A (May 21, 2007)
Patent Document 3: KR 10-0869163 B1 (Nov. 11, 2008)

Technical Problem

An embodiment of the present disclosure is directed to providing a substrate which is uniformly coated with a high-density CNT film having excellent adhesive strength with a base material and high stability to water or an organic solvent, using a click reaction.

Another embodiment of the present disclosure is directed to providing a manufacturing method of a high-density CNT film coated substrate, of which the process is easy and has high reproducibility, using a click reaction.

Solution to Problem

In order to achieve the object, the present inventors continuously studied in order to develop a high-density CNT film-coated substrate having high reproducibility due to the uniform CNT film, excellent adhesive strength with a base material, and stability to water or an organic solvent and a manufacturing method thereof, and surprisingly, found that when a CNT film-coated substrate is manufactured using a click reaction, a high-density CNT film-coated substrate which has a CNT film uniformly formed with a high density, has excellent adhesive strength between the CNT film and a base material, and has good stability to water or an organic solvent, and thus, is not peeled off even after washing, may be manufactured, thereby completing the present disclosure.

In one general aspect, a CNT film-coated substrate includes: a base substrate layer, a $P_1$ polymer coating layer formed on the base substrate layer, a $P_2$ (CNT) polymer coating layer formed on the $P_1$ polymer coating layer, wherein in the $P_2$ (CNT) polymer coating layer, CNT is wrapped by a $P_2$ polymer, and the $P_1$ polymer coating layer and the $P_2$ (CNT) polymer coating layer are bonded by a triazole ring.

Specifically, the CNT film coated substrate according to an exemplary embodiment may include the following Chemical Formula 1:

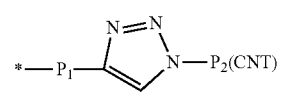

Chemical Formula 1

Chemical Formula 1 is formed by a click reaction of a compound represented by the following Chemical Formula 2 and a compound represented by the following Chemical Formula 3, and the click reaction may be represented by the following Reaction Formula 1:

Chemical Formula 2 wherein $F_1$ is an alkynyl functional group, and x is an integer of 1 or more,

Chemical Formula 3 wherein $F_2$ is an azide functional group, and y is an integer of 1 or more,

Reaction Formula 1

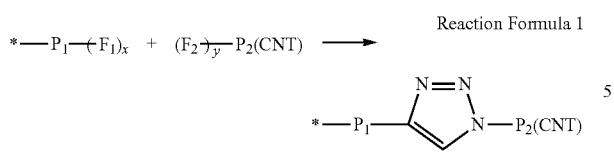

In some embodiments, $P_1$ of Chemical Formula 2 according to an exemplary embodiment of the present disclosure may be an acrylic copolymer.

In addition, Chemical Formula 2 according to an exemplary embodiment of the present disclosure may be represented by the following Chemical Formula 4 or 5:

Chemical Formula 4

Chemical Formula 5

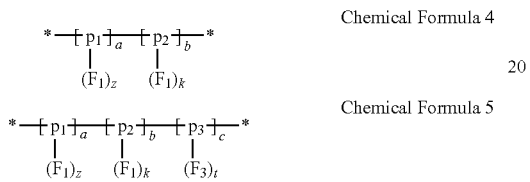

wherein $F_1$ is an alkynyl functional group; $F_3$ is an epoxy functional group; $p_1$ and $p_2$ are a repeating unit derived from a monomer having the $F_1$ functional group at the end; $p_3$ is a repeating unit derived from a monomer having the $F_3$ functional group at the end; z, k, and t are an integer of 1 to 7; and a, b, and c are an integer of 1 or more.

In some embodiments, Chemical Formula 4 according to an exemplary embodiment of the present disclosure may be represented by the following Chemical Formula 6:

Chemical Formula 6

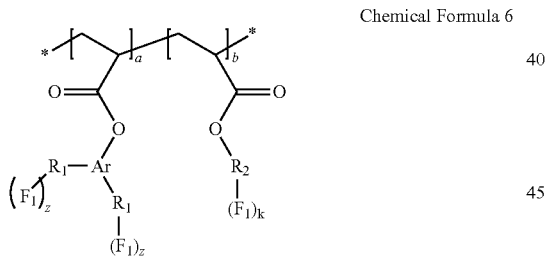

wherein Ar is a trivalent aromatic radical; $R_1$ and $R_2$ are independently of each other $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $F_1$ is an alkynyl functional group; z and k are an integer of 1 to 7; and a and b are an integer of 1 or more.

More specifically, Chemical Formula 6 according to an exemplary embodiment of the present disclosure may be represented by the following Chemical Formula 7:

Chemical Formula 7

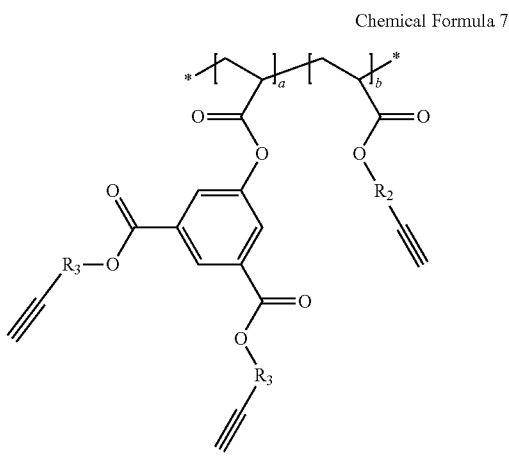

wherein $R_2$ and $R_3$ are independently of each other $C_{1-10}$ alkylene; and a and b are an integer of 1 or more.

Chemical Formula 5 according to an exemplary embodiment of the present disclosure may be represented by the following Chemical Formula 8:

Chemical Formula 8

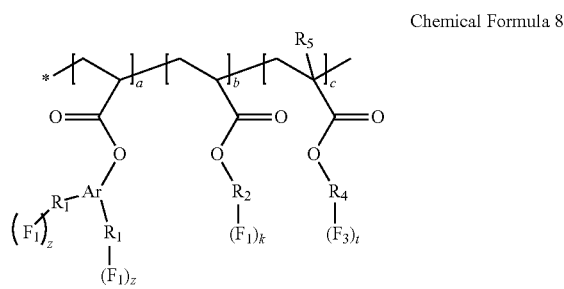

wherein Ar is a trivalent aromatic radical; $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $R_5$ is hydrogen or $C_{1-3}$ alkyl; $F_1$ is an alkynyl functional group; $F_3$ is an epoxy functional group; z, k, and t are an integer of 1 to 7; and a, b, and c are an integer of 1 or more.

More specifically, Chemical Formula 8 according to an exemplary embodiment of the present disclosure may be represented by the following Chemical Formula 9:

Chemical Formula 9

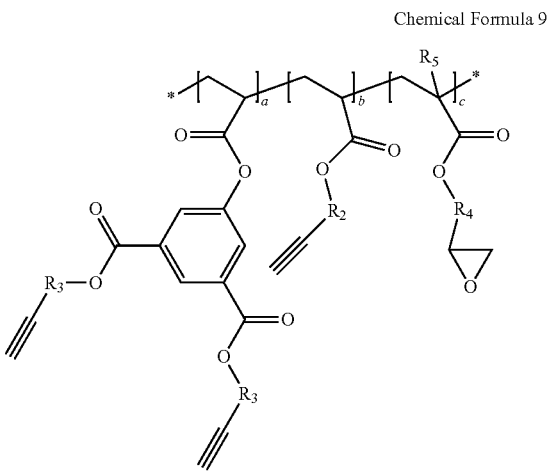

wherein $R_2$ to $R_4$ are independently of one another $C_{1-10}$ alkylene; $R_5$ is hydrogen or methyl; and a, b, and c are an integer of 1 or more.

In some embodiments, $P_2$ of Chemical Formula 3 according to an exemplary embodiment of the present disclosure may be a fluorene-based copolymer.

In some embodiments, Chemical Formula 3 according to an exemplary embodiment of the present disclosure may be represented by the following Chemical Formula 10:

Chemical Formula 10

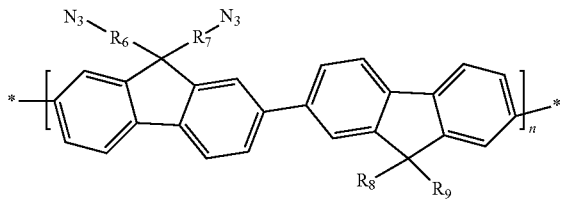

wherein $R_6$ and $R_7$ are independently of each other $C_{5-50}$ alkylene; $R_8$ and $R_9$ are independently of each other $C_{5-50}$ alkyl; and n is an integer of 1 or more.

In addition, the CNT film coated substrate according to an exemplary embodiment of the present disclosure may further include a self-assembled monolayer (SAM) between the base substrate layer and the $P_1$ polymer coating layer, and specifically, the self-assembled monolayer may be chemically bonded with the base substrate layer and the $P_1$ polymer coating layer.

In some embodiments, the self-assembled monolayer (SAM) of the CNT film coated substrate according to an exemplary embodiment of the present disclosure may be a unit derived from a compound represented by the following Chemical Formula 11:

Chemical Formula 11

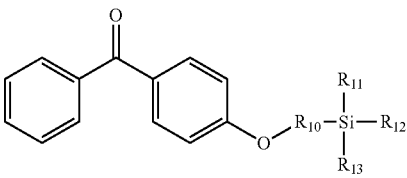

wherein $R_{10}$ is $C_{1-10}$ alkylene; $R_{11}$ to $R_{13}$ are independently of one another hydroxy, halogen, $C_{1-10}$ alkyl, $C_{1-10}$ haloalkyl, $C_{1-10}$ alkoxy, or $C_{1-10}$ alkoxycarbonyl.

CNT of the $P_2$ (CNT) polymer coating layer of the CNT film coated substrate according to an exemplary embodiment of the present disclosure may be a metallic single-walled carbon nanotube (m-SWCNT), a semiconductive single-walled carbon nanotube (sc-SWCNT), or a mixture thereof.

In another general aspect, a manufacturing method of a CNT film-coated substrate is provided, the CNT film-coated substrate including: a base substrate layer, a Pu polymer coating layer formed on the base substrate layer, a $P_2$ (CNT) polymer coating layer formed on the Pu polymer coating layer, wherein in the $P_2$ (CNT) polymer coating layer, CNT is wrapped by a $P_2$ polymer, and the Pu polymer coating layer and the $P_2$ (CNT) polymer coating layer are bonded by a triazole ring.

In some embodiments, the manufacturing method of a CNT film coated substrate according to an exemplary embodiment of the present disclosure may include:

(a) applying and fixing a compound represented by Chemical Formula 2 on the base substrate layer;

(b) immersing the coated base substrate layer in a $P_2$ (CNT) solution;

(c) performing a click reaction of the compound represented by Chemical Formula 2 and a compound represented by Chemical Formula 3; and (d) after completing the reaction, washing an unreacted compound with an organic solvent:

$P_1$—$(F_1)_x$     Chemical Formula 2 wherein Fu is an alkynyl functional group, and x is an integer of 1 or more, $P_2$—$(F_2)_y$     Chemical Formula 3 wherein $F_2$ is an azide functional group, and y is an integer of 1 or more.

In some embodiments, in the manufacturing method of a CNT film coated substrate according to an exemplary embodiment of the present disclosure, the step (a) of applying and fixing the compound represented by Chemical Formula 2 on the base substrate layer may include:

(a-1) washing the base substrate layer with a solvent;
(a-2) applying a self-assembled monolayer (SAM);
(a-3) applying the compound represented by Chemical Formula 2;
(a-4) performing UV curing; and
(a-5) washing compounds unfixed to the substrate layer with a solvent.

In the manufacturing method of a CNT film coated substrate according to an exemplary embodiment of the present disclosure, the step (a-2) of applying a self-assembled monolayer may include immersing the washed base substrate layer in a self-assembled monolayer solution.

In the manufacturing method of a CNT film coated substrate according to an exemplary embodiment of the present disclosure, the self-assembled monolayer solution may include a compound represented by Chemical Formula 11:

Chemical Formula 11

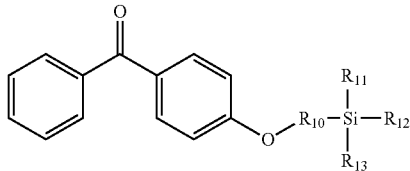

wherein $R_{10}$ is $C_{1-10}$ alkylene; $R_{11}$ to $R_{13}$ are independently of one another hydroxy, halogen, $C_{1-10}$ alkyl, $C_{1-10}$ haloalkyl, $C_{1-10}$ alkoxy, or $C_{1-10}$ alkoxycarbonyl.

In the step (a-3) of applying the compound represented by Chemical Formula 2 in the manufacturing method of a CNT film coated substrate according to an exemplary embodiment of the present disclosure, the compound may be applied by one method selected from spin coating, dip coating, dropping, spray coating, solution casting, bar coating, roll coating, gravure coating, and the like.

In some embodiments, in the manufacturing method of a CNT film coated substrate according to an exemplary embodiment of the present disclosure, the compound represented by Chemical Formula 2 of the step (a-3) of applying the compound represented by Chemical Formula 2 may be represented by the following Chemical Formula 4:

Chemical Formula 4

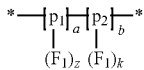

wherein $F_1$ is an alkynyl functional group; $p_1$ and $p_2$ are a repeating unit derived from a monomer having the $F_1$ functional group at the end; z and k are an integer of 1 to 7; and a and b are an integer of 1 or more.

In some embodiments, in the manufacturing method of a CNT film coated substrate according to an exemplary embodiment of the present disclosure, Chemical Formula 4 may be represented by the following Chemical Formula 6:

Chemical Formula 6

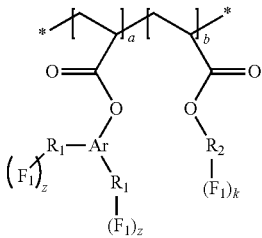

wherein Ar is a trivalent aromatic radical; $R_1$ and $R_2$ are independently of each other $C_{1-50}$ alkylene, $C_{3-50}$ cycloalkylene, $C_{6-50}$ arylene, $C_{3-50}$ heteroarylene, alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $F_1$ is an alkynyl functional group; z and k are an integer of 1 to 7; and a and b are an integer of 1 or more.

Specifically, in the manufacturing method of a CNT film coated substrate according to an exemplary embodiment of the present disclosure, Chemical Formula 6 may be represented by the following Chemical Formula 7:

Chemical Formula 7

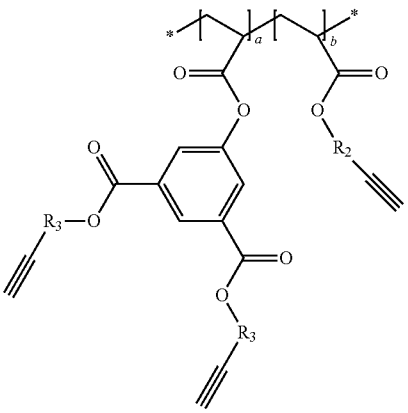

wherein $R_2$ and $R_3$ are independently of each other $C_{1-10}$ alkylene; and a and b are an integer of 1 or more.

In the manufacturing method of a CNT film coated substrate according to an exemplary embodiment of the present disclosure, the UV curing step (a-4) may further include a pattern forming step.

In some embodiments, in the manufacturing method of a CNT film coated substrate according to an exemplary embodiment of the present disclosure, the step (a) of applying and fixing the compound represented by Chemical Formula 2 on the base substrate layer may include:

(a'-1) washing the base substrate layer with a solvent;
(a'-2) applying the compound represented by Chemical Formula 2;
(a'-3) performing a heat treatment; and
(a'-4) washing compounds unfixed to the substrate layer with a solvent.

In some embodiments, in the manufacturing method of a CNT film coated substrate according to an exemplary embodiment of the present disclosure, the compound represented by Chemical Formula 2 may be represented by the following Chemical Formula 5:

Chemical Formula 5

wherein $F_1$ is an alkynyl functional group; $F_3$ is an epoxy functional group; $p_1$ and $p_2$ are a repeating unit derived from a monomer having the $F_1$ functional group at the end; $p_3$ is a repeating unit derived from a monomer having the $F_3$ functional group at the end; z, k, and t are an integer of 1 to 7; and a, b, and c are an integer of 1 or more.

In some embodiments, in the manufacturing method of a CNT film coated substrate according to an exemplary embodiment of the present disclosure, Chemical Formula 5 may be represented by the following Chemical Formula 8:

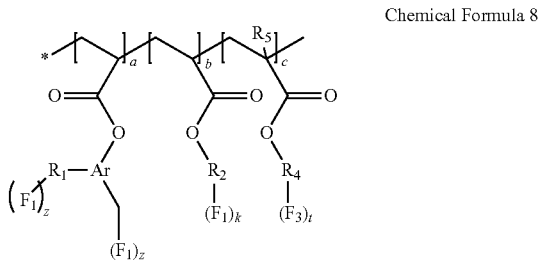

Chemical Formula 8 wherein Ar is a trivalent aromatic radical; $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $R_5$ is hydrogen or $C_{1-3}$ alkyl; $F_1$ is an alkynyl functional group; $F_3$ is an epoxy functional group; z, k, and t are an integer of 1 to 7; and a, b, and c are an integer of 1 or more.

More specifically, Chemical Formula 8 according to an exemplary embodiment of the present disclosure may be represented by the following Chemical Formula 9:

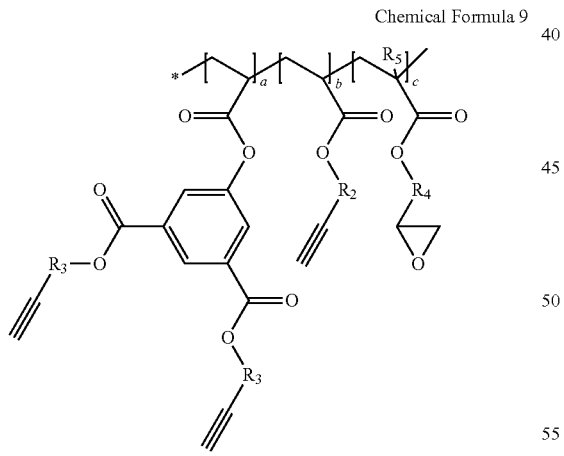

Chemical Formula 9 wherein $R_2$ to $R_4$ are independently of one another $C_{1-10}$ alkylene; $R_5$ is hydrogen or methyl; and a, b, and c are an integer of 1 or more.

The compound in the step (a'-2) of applying the compound represented by Chemical Formula 2 in the manufacturing method of a CNT film coated substrate according to an exemplary embodiment of the present disclosure may be applied by one method selected from spin coating, dip coating, dropping, spray coating, solution casting, bar coating, roll coating, gravure coating, and the like.

In the manufacturing method of a CNT film coated substrate according to an exemplary embodiment of the present disclosure, the step (c) of performing a click reaction of the compound represented by Chemical Formula 2 and a compound represented by Chemical Formula 3 may be adjusting the density of the CNT film depending on a click reaction time.

In the manufacturing method of a CNT film coated substrate according to an exemplary embodiment of the present disclosure, the $P_2$ (CNT) solution may include the compound represented by Chemical Formula 3, CNT, and a solvent. Specifically, the $P_2$ (CNT) solution may be a solution in which the compound represented by Chemical Formula 3 wrapping CNT is dissolved in a solvent.

In some embodiments, the CNT may be a metallic single-walled carbon nanotube (m-SWCNT), a semiconductive single-walled carbon nanotube (sc-SWCNT), or a mixture thereof.

In another general aspect, an acrylate copolymer represented by the following Chemical Formula 6 is provided:

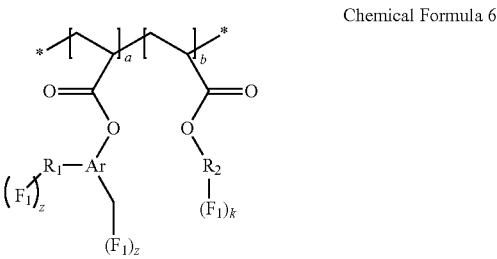

Chemical Formula 6 wherein Ar is a trivalent aromatic radical; $R_1$ and $R_2$ are independently of each other $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $F_1$ is an alkynyl functional group; z and k are an integer of 1 to 7; and a and b are an integer of 1 or more.

In still another general aspect, an acrylate copolymer represented by the following Chemical Formula 8 is provided:

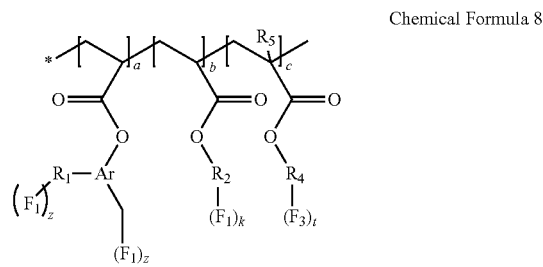

Chemical Formula 8 wherein Ar is a trivalent aromatic radical; $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $R_5$ is hydrogen or $C_{1-3}$ alky; $F_1$ is an alkynyl functional group; $F_3$ is an epoxy functional group; z, k, and t are an integer of 1 to 7; and a, b, and c are an integer of 1 or more.

DETAILED DESCRIPTION

Best Mode

Figure 1:
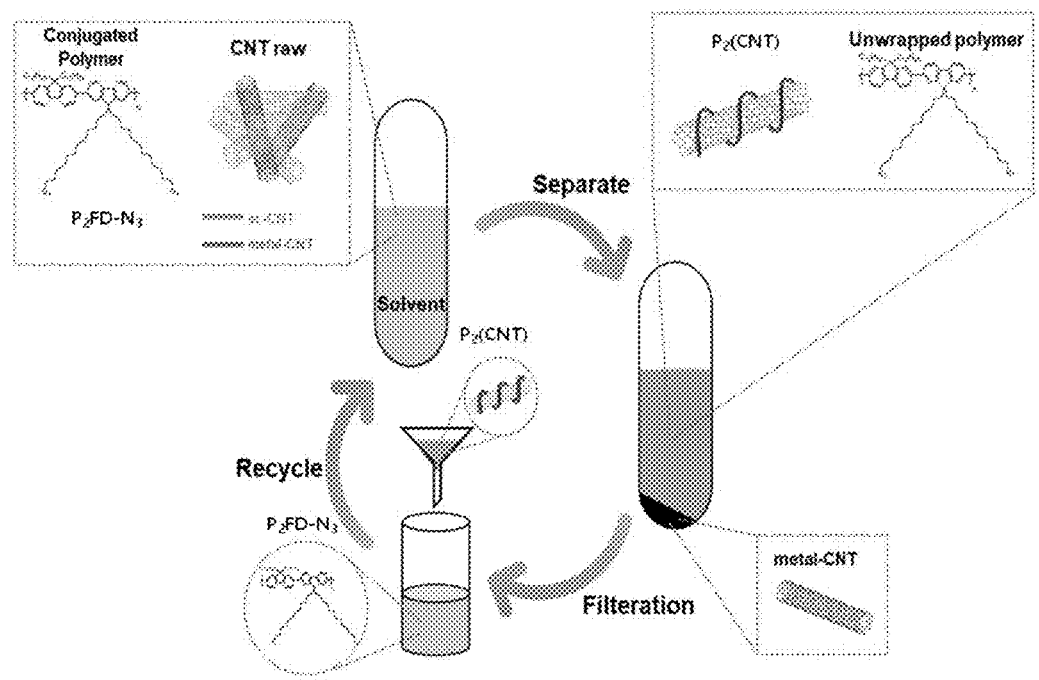
FIG. 1 is a process schematic diagram showing a preparation process of a $P_2$ (CNT) solution of Preparation Example 5 according to the present disclosure.

Hereinafter, a high-density CNT film coated substrate using a click reaction and a manufacturing method thereof according to the present disclosure will be described in detail. Here, technical terms and scientific terms used in the present specification have the general meaning understood by those skilled in the art to which the present disclosure pertains unless otherwise defined, and a description for the known function and configuration which may unnecessarily obscure the gist of the present disclosure will be omitted in the following description.

The singular form used in the present specification may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, the numerical range used in the present specification includes all values within the range including the lower limit and the upper limit, increments logically derived in a form and span in a defined range, all double limited values, and all possible combinations of the upper limit and the lower limit in the numerical range defined in different forms. Unless otherwise defined in the specification of the present disclosure, values which may be outside a numerical range due to experimental error or rounding of a value are also included in the defined numerical range.

In addition, in the present disclosure, when a layer is referred to as being "on" another layer, it may include not only the case of being in contact with another layer but also the case in which one or more other layers are interposed between the two layers.

The term "polymer" in the present specification includes a polymer and a copolymer.

The term "acrylic" in the present specification includes both methacrylic and acrylic.

The term "acrylate" in the present specification includes both methacrylate and acrylate.

The term "wrapping" in the present specification means that a polymer wraps CNT by an electrostatic interaction, and may include the meanings of coating, application, bonding, and adhesion. In addition, the electrostatic interaction may refer to a π-electron interaction (π-π (stacking interaction).

The term "alkyl" in the present specification includes both a linear chain form and a branched chain form, and may have 1 to 30 carbon atoms, such as 1 to 20 carbon atoms.

The terms "halogen" and "halo" in the present specification refer to fluorine, chlorine, bromine, or iodine.

The term "haloalkyl" in the present specification refers to an alkyl group in which one or more hydrogen atoms are replaced with a halogen atom, respectively. For example, the haloalkyl includes —$CF_3$, —$CHF_2$, —$CH_2F$, —$CBr_3$, —$CHBr_2$, —$CH_2Br$, —$CCl_3$, —$CHCl_2$, —$CH_2Cl$, —$CI_3$, —$CHI_2$, —$CH_2I$, —$CH_2$—$CF_3$, —$CH_2$—$CHF_2$, —$CH_2$—$CH_2F$, —$CH_2$—$CBr_3$, —$CH_2$—$CHBr_2$, —$CH_2$—$CH_2Br$, —$CH_2$—$CCl_3$, —$CH_2$—$CHCl_2$, —$CH_2$—$CH_2Cl$, —$CH_2$—$CI_3$, —$CH_2$—$CHI_2$, —$CH_2$—$CH_2I$, and the like. Herein, alkyl and halogen are as defined above.

The term "alkenyl" in the present specification refers to a saturated linear chain or branched chain acyclic hydrocarbon having 2 to 30, or 2 to 20 carbon atoms and at least one carbon-carbon double bond.

The term "alkynyl" in the present specification refers to a saturated linear chain or branched chain acyclic hydrocarbon having 2 to 30, or 2 2 to 20 carbon atoms and at least one carbon-carbon triple bond.

The term "alkoxy" in the present specification refers to —O-(alkyl) including —OCH$_3$, —OCH$_2$CH$_3$, —O(CH$_2$)$_2$CH$_3$, —O(CH$_2$)$_3$CH$_3$, —O(CH$_2$)$_4$CH$_3$, —O(CH$_2$)$_5$CH$_3$, and the like, in which alkyl is as defined above.

The term "aryl" in the present specification refers to a carbocyclic aromatic group containing 5-membered to 10-membered ring atoms. A representative example includes phenyl, tolyl, xylyl, naphthyl, tetrahydronaphthyl, anthracenyl, fluorenyl, indenyl, azulenyl, and the like, but is not limited thereto. Furthermore, aryl includes a carbocyclic aromatic group being linked by alkylene or alkenylene or being linked by one or more heteroatoms selected from B, O, N, C(=O), P, P(=O), S, S(=O)$_2$, and a Si atom.

The term "alkoxycarbonyl" in the present specification refers to an alkoxy-C(=O)—* radical, in which alkoxy is as defined above. An example of the alkoxycarbonyl radical includes methoxycarbonyl, ethoxycarbonyl, isopropoxycarbonyl, propoxycarbonyl, butoxycarbonyl, isobutoxycarbonyl, t-butoxycarbonyl, and the like, but is not limited thereto.

The term "cycloalkyl" in the present specification refers to a monocyclic or polycyclic saturated ring having carbon and hydrogen atoms and no carbon-carbon multiple bond. An example of the cycloalkyl group includes C$_{3-10}$ cycloalkyl (for example, cyclopropyl, cyclobutyl, cyclopentyl, cyclohexyl, and cycloheptyl), but is not limited thereto. The cycloalkyl group may be optionally substituted. In an exemplary embodiment, the cycloalkyl group is a monocyclic or bicyclic ring.

The term "arylalkyl" in the present specification is alkyl in which one or more hydrogens are replaced with aryl, and includes benzyl and the like.

The terms "alkylene", "alkenylene", "alkynylene", "cycloalkylene", "arylene", "heteroarylene", and "alkoxycarbonylene" in the present specification refer to divalent organic radicals derived by removing one hydrogen from "alkyl", "alkenyl", "alkynyl", "cycloalkyl", "aryl", "heteroaryl", and "alkoxycarbonyl", and follows each of the definitions of alkyl, alkenyl, alkynyl, cycloalkyl, aryl, heteroaryl, and alkoxycarbonyl.

In the present specification, the term "hydroxy" refers to —OH, the term "nitro" refers to —NO$_2$, the term "cyano" refers to —CN, the term "amino" refers to —NH$_2$, the term "carboxyl" refers to —COOH, and the term "carboxylic acid salt" refers to —COOM. M may be an alkali metal or alkali earth metal.

The term "alkali metal" in the present specification refers to lithium (Li), sodium (Na), potassium (K), rubidium (Rb), cesium (Cs), and francium (Fr), which are chemical elements of Group 1 of the periodic table except hydrogen, and the term "alkali earth metal" in the present specification refers to beryllium (Be), magnesium (Mg), calcium (Ca), strontium (Sr), barium (Ba), and radium (Ra), which are Group 2 elements of the periodic table.

The term "comprise" described in the present disclosure is an open-ended description having a meaning equivalent to the term such as "is/are provided", "contain", "have", or "is/are characterized", and does not exclude elements, materials or processes which are not further listed.

The present disclosure provides a CNT film-coated substrate including: a base substrate layer, a P$_1$ polymer coating layer formed on the base substrate layer, and a P$_2$ (CNT) polymer coating layer formed on the P$_1$ polymer coating layer. Specifically, in the P$_2$ (CNT) polymer coating layer, CNT is wrapped by a P$_2$ polymer, and the P$_1$ polymer coating layer and the P$_2$ (CNT) polymer coating layer are bonded by a triazole ring.

The base substrate layer may be an inorganic substrate including glass, quartz, silicon, and the like, or an organic substrate including polyethylene terephthalate, polyethylene sulfone, polycarbonate, polystyrene, polypropylene, polyester, polyimide, polyetheretherketone, polyetherimide, acryl resin, olefin maleimide copolymer, and the like, but is not limited thereto. In addition, the base substrate layer may be a usual silicon wafer, a substrate having an oxide film formed on the inorganic substrate, or a flexible substrate including the organic substrate, plastic, and the like, but is not particularly limited as long as a CNT film may be formed on the substrate. Additionally, in order to improve adhesive strength between the base substrate and the CNT film, a physical or chemical treatment may be performed. The CNT film is formed on the base substrate and may be applied to a semiconductor device, a transparent electrode, a display, and the like.

Specifically, the CNT film coated substrate according to an exemplary embodiment may include the following Chemical Formula 1:

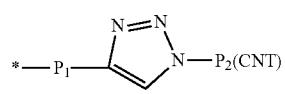

Chemical Formula 1

Chemical Formula 1 is formed by a click reaction of a compound represented by the following Chemical Formula 2 and a compound represented by the following Chemical Formula 3, and the click reaction may be represented by the following Reaction Formula 1:

Chemical Formula 2 wherein F$_1$ is an alkynyl functional group, and x is an integer of 1 or more,

Chemical Formula 3 wherein F$_2$ is an azide functional group, and y is an integer of 1 or more,

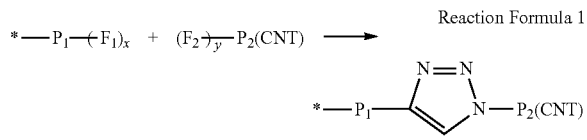

Reaction Formula 1

Reaction Formula 1 may be specifically represented by the following Reaction Formula 2:

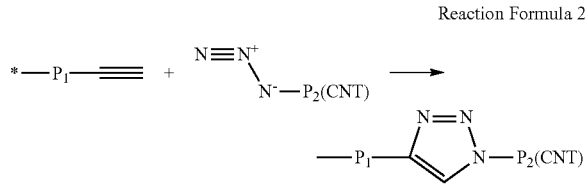

Reaction Formula 2

As seen in the above Reaction Formulae 1 and 2, the alkynyl functional group of Chemical Formula 2 and the azide functional group of Chemical Formula 3 may form a triazole ring by a click reaction in the presence of a copper catalyst. P$_1$ and P$_2$ (CNT) are chemically bonded by the triazole ring, thereby forming a P$_1$ polymer coating layer and a $P_2$ (CNT) polymer coating layer on the base substrate layer. The type of $P_1$ polymer is not particularly limited as long as it has the alkynyl functional group, and the type of $P_2$ polymer is also not limited as long as it has an azide functional group.

In some embodiments, $P_1$ of Chemical Formula 2 according to an exemplary embodiment of the present disclosure may be an acrylic copolymer. The acrylic copolymer may be obtained by polymerizing two or more monomers, and the monomer may be an acrylic monomer or a methacrylic monomer. The monomer may have hydroxy, epoxy, carboxyl, thiol, alkene, and alkynyl as a functional group, and, for instance, may have epoxy and alkynyl functional groups. The monomer may be used by direct synthesis or may be a commercially available product, but is not limited thereto.

In addition, the acrylic copolymer may be synthesized by a commonly used copolymerization method. In some embodiments, it may be synthesized by solution polymerization, but is not limited thereto. The solution polymerization may be polymerization including the monomer, the initiator, and the solvent, and the initiator and the solvent are not particularly limited as long as they are commonly used, but, for instance, the initiator may be azobisisobutyronitrile (AIBN) and the solvent may be dimethylformamide (DMF). In addition, the content is not particularly limited as long as it does not impair the physical properties described in the present disclosure.

In addition, the $P_1$ polymer may have a number average molecular weight (Mn) of 5,000 to 100,000 Da, or 10,000 to 60,000 Da, or 10,000 to 30,000 Da, but is not limited thereto. The number average molecular weight may be adjusted by the content ratio and the polymerization conditions of the monomer.

Specifically, Chemical Formula 2 according to an exemplary embodiment of the present disclosure may be represented by the following Chemical Formula 4 or 5:

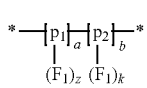

Chemical Formula 4 wherein $F_1$ is an alkynyl functional group; $p_1$ and $p_2$ are a repeating unit derived from a monomer having the $F_1$ functional group at the end; z and k are independently an integer of 1 to 7; and a and b are an integer of 1 or more. Specifically, z and k may be independently an integer of 1 to 3, a and b may satisfy 0.1 to 10:1, or 0.5 to 5:1, or 0.8 to 2:1, but the present disclosure is not particularly limited thereto. In addition, the alkynyl functional group may form a triazole ring with the azide functional group of Chemical Formula 3 by a click reaction.

In addition, $p_1$ and $p_2$ may be a repeating unit derived from a monomer having the $F_1$ functional group at the end, and specifically, the monomer is not largely limited as long as it is capable of condensation polymerization or addition polymerization, but, for example, may be one or more monomers selected from acrylic, methacrylic, vinyl-based monomers, and the like capable of radical polymerization.

In Chemical Formula 4, a and b may refer to a mole ratio of $p_1$ and $p_2$ repeating units in the $P_1$ copolymer. A ratio of a and b may be adjusted by adjusting a mole ratio of introduced monomers corresponding to $p_1$ and $p_2$ repeating units or adjusting polymerization conditions, but the present disclosure is not limited thereto.

Specifically, Chemical Formula 4 according to an exemplary embodiment of the present disclosure may be represented by the following Chemical Formula 6:

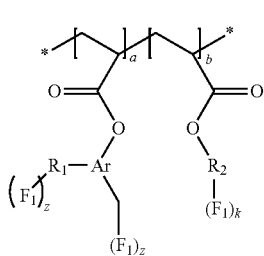

Chemical Formula 6 wherein Ar is a trivalent aromatic radical; $R_1$ and $R_2$ are independently of each other $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $F_1$ is an alkynyl functional group; z and k are an integer of 1 to 7; and a and b are an integer of 1 or more.

In some embodiments, in Chemical Formula 6, $R_1$ and $R_2$ may be independently $C_{1-20}$ alkylene, $C_{6-20}$ arylene, $C_{1-20}$ alkoxycarbonylene, or a combination thereof, the alkylene, arylene, and heteroarylene may be optionally substituted with one or more selected from hydroxy, halogen, carboxyl, $C_{1-7}$ alkyl, $C_{1-7}$ haloalkyl, $C_{1-7}$ alkoxy, $C_{1-7}$ alkoxycarbonyl, $(C_{6-20})$aryl$(C_{1-7})$alkyl, and $C_{6-20}$ aryl; z and k may be an integer of 1 to 3; and a and b may satisfy 0.1 to 10:1, or 0.5 to 5:1.

Specifically, Chemical Formula 6 according to an exemplary embodiment of the present disclosure may be represented by the following Chemical Formula 7:

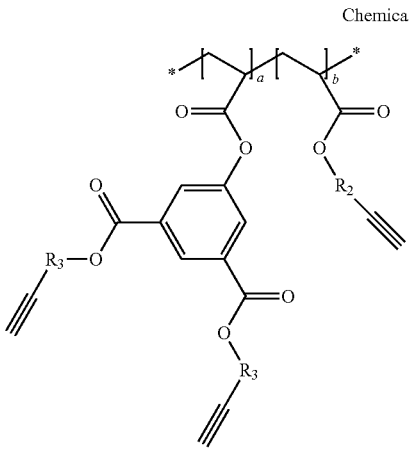

Chemical Formula 7 wherein $R_2$ and $R_3$ are independently of each other a direct bond or $C_{1-10}$ alkylene, and a and b are an integer of 1 or more. In some embodiments, $R_2$ and $R_3$ may be independently $C_{1-3}$ alkylene, or $R_2$ and $R_3$ may be methylene, and a and b may satisfy 0.8 to 2:1.

In addition, in Chemical Formula 4, z and k refer to the number of $F_1$ linked to the $p_1$ and $p_2$ repeating units, respectively, and taking Chemical Formula 7 as an example, z may be 2 and k may be 1.

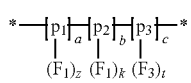

Chemical Formula 5 wherein $F_1$ is an alkynyl functional group; $F_3$ is an epoxy functional group; $p_1$ and $p_2$ are a repeating unit derived from a monomer having the $F_1$ functional group at the end; $p_3$ is a repeating unit derived from a monomer having the $F_3$ functional group at the end; z, k, and t are an integer of 1 to 7; and a, b, and c are an integer of independently 1 or more. In some embodiments, z, k, and t may be independently an integer of 1 to 3, and a, b, and c may satisfy 0.1 to 10:0.1 to 10:1, or 0.5 to 5:0.5 to 5:1, or 1 to 3:1 to 3:1, but is not limited thereto. In addition, the epoxy functional group may be chemically bonded to the base substrate layer, and the alkynyl functional group may form a triazole ring with the azide functional group of Chemical Formula 3 by a click reaction.

In addition, $p_1$ and $p_2$ may be a repeating unit derived from a monomer having the $F_1$ functional group at the end, $p_3$ may be a repeating unit derived from a monomer having the $F_3$ functional group at the end, and specifically, the monomer is not largely limited as long as it is capable of condensation polymerization or addition polymerization, but, for instance, may be one or more monomers selected from acrylic, methacrylic, vinyl-based monomers, and the like capable of radical polymerization.

In Chemical Formula 5, a to c may refer to a mole ratio of $p_1$ to $p_3$ repeating units in the $P_1$ copolymer. A ratio of a to c may be adjusted by adjusting a mole ratio of introduced monomers corresponding to $p_1$ to $p_3$ repeating units or adjusting polymerization conditions, but the present disclosure is not limited thereto.

Specifically, Chemical Formula 5 according to an exemplary embodiment of the present disclosure may be represented by the following Chemical Formula 8:

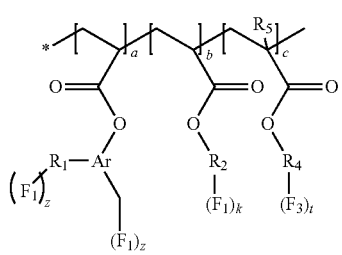

Chemical Formula 8 wherein Ar is a trivalent aromatic radical; $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30}aryl)(C_{1-20})alkyl$, $C_{6-30}$ aryl, and $C_{3-30}$ heteroaryl; $R_5$ is hydrogen or $C_{1-3}$ alkyl; z, k, and t are an integer of 1 to 7; and a, b, and c are an integer of 1 or more.

In some embodiments, in Chemical Formula 8, Ar may be a trivalent aromatic radical; $R_1$, $R_2$ and $R_4$ may be independently of one another $C_{1-20}$ alkylene, $C_{6-20}$ arylene, $C_{1-20}$ alkoxycarbonylene, or a combination thereof, the alkylene, arylene, and heteroarylene may be optionally substituted with one or more selected from hydroxy, halogen, carboxyl, $C_{1-7}$ alkyl, $C_{1-7}$ haloalkyl, $C_{1-7}$ alkoxy, $C_{1-7}$ alkoxycarbonyl, $(C_{6-20})aryl(C_{1-7})alkyl$, and $C_{6-20}$ aryl; $R_5$ may be hydrogen or methyl; z and k may be an integer of 1 to 3; and a, b, and c may satisfy 0.1 to 10:0.1 to 10:1, or 0.5 to 5:0.5 to 5:1.

Specifically, Chemical Formula 8 according to an exemplary embodiment of the present disclosure may be represented by the following Chemical Formula 9:

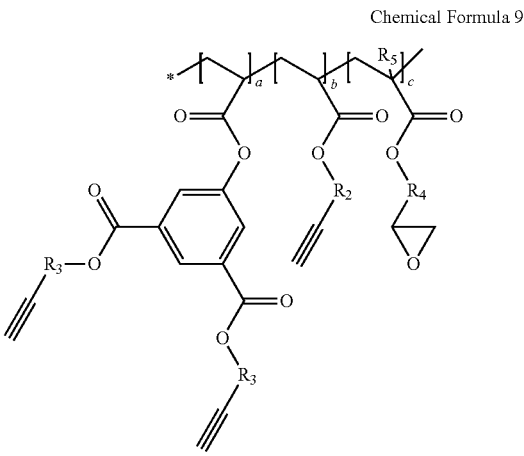

Chemical Formula 9 wherein $R_2$ to $R_4$ are independently $C_{1-10}$ alkylene, $R_5$ is hydrogen or methyl, and a, b, and c are an integer of 1 or more. In some embodiments, $R_2$ to $R_4$ may be independently $C_{1-3}$ alkylene, $R_5$ may be methyl, and a, b, and c may satisfy 1 to 3:1 to 3:1.

In addition, z, k, and t of Chemical Formula 5 refer to the number of $F_1$ and $F_3$ linked to the $p_1$, $p_2$, and $p_3$ repeating units, respectively, and taking Chemical Formula 9 as an example, z may be 2, k may be 1, and t may be 1.

In Chemical Formulae 4 and 5 according to an exemplary embodiment of the present disclosure, $p_1$ to $p_3$ may refer to independently of one another a repeating unit forming the $P_1$ polymer of Chemical Formula 2. In Chemical Formulae 4 and 5, the $p_1$ and $p_2$ repeating units may be independently of each other derived from a monomer including one or more $F_1$ functional groups at the end, and in Chemical Formula 5, the $p_3$ repeating unit may be derived from a monomer including one or more $F_3$ functional groups at the end. The $F_1$ functional group may be an alkynyl functional group, the $F_3$ functional group may be an epoxy functional group, the type of monomer is not largely limited as long as it is capable of polymerization, and specifically, the type of monomer is not particularly limited as long as it is a monomer capable of condensation polymerization or addition polymerization. In some embodiments, monomers such as acrylic, methacrylic, and vinyl-based monomers capable of radical polymerization may be included, but the present disclosure is not limited thereto.

In addition, the ratio of a to c in Chemical Formula 4 and 5 may be adjusted by adjusting the monomer mole ratio. Specifically, the mole ratio of the monomer introduced to polymerization may be adjusted to adjust the ratio of a and b of Chemical Formula 4 and adjust the ratio of a to c of Chemical Formula 5. That is, the mole ratio of the corresponding monomer introduced to polymerization and the ratio of repeating units $p_1$ to $p_3$ may be similar or identical to each other. Specifically, the repeating unit $p_1$ corresponds to a, the repeating unit $p_2$ corresponds to b, and the repeating unit $p_3$ corresponds to c, and when the monomer corresponding to each of $p_1$ to $p_3$ is introduced at a mole ratio of 2:2:1 and polymerized, a:b:c may be identical to or similar to 2:2:1, but the present disclosure is not particularly limited thereto, and the ratio may be adjusted depending on the reactivity of each monomer and polymerization conditions.

The type of $P_2$ of Chemical Formula 3 according to an exemplary embodiment of the present disclosure is not particularly limited as long as it has an azide functional group at the end. Specifically, $P_2$ may be selected from acrylic, urethane-based, epoxy-based, fluorene-based, carbazole-based, thiophene-based, and olefine-based polymers and the like, but is not limited thereto. $P_2$ may be synthesized by polymerizing one or more monomers, and the polymerization may be synthesis in the manner of condensation polymerization or addition polymerization, but the present disclosure is not particularly limited thereto, and the monomer of $P_2$ may be used without particular limitation as long as it has an azide functional group at the and is capable of CNT wrapping.

In some embodiments, $P_2$ may be a fluorene-based copolymer, and specifically, the fluorene-based copolymer may be obtained by copolymerizing two or more fluorene-based monomers. When the CNT film coated substrate is manufactured using a fluorene-based copolymer which is a conjugated polymer having electrical conductivity, a high-density CNT film may be formed without deteriorating the electrical properties of the CNT film.

Specifically, Chemical Formula 3 according to an exemplary embodiment of the present disclosure may be represented by the following Chemical Formula 10:

Chemical Formula 10

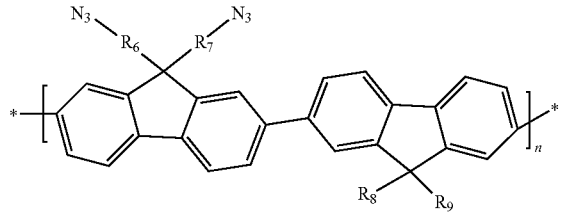

wherein $R_6$ and $R_7$ are independently of each other $C_{5-50}$ alkylene; $R_8$ and $R_9$ are independently $C_{5-50}$ alkyl; and n is an integer of 1 or more. In some embodiments, $R_6$ and $R_7$ may be independently $C_{5-20}$ alkylene, $R_8$ and $R_9$ are independently $C_{5-20}$ alkyl, and alkylene and alkyl satisfying the number of carbons in the range may effectively wrap CNT by a π electron interaction (π-π stacking interaction) with a CNT side wall surface. By the alkylene and alkyl optionally wrap sc-SWCNT and form a $P_2$ (CNT) layer, a high-density CNT film-coated substrate having further improved electrical properties may be manufactured.

In addition, the CNT film coated substrate according to an exemplary embodiment of the present disclosure may further include a self-assembled monolayer (SAM) between the base substrate layer and the $P_1$ polymer coating layer. Specifically, the self-assembled monolayer includes a material which easily reacts with the surface of a substrate layer, as an example, a silane coupling agent, and may be a unit derived from a photopolymerization initiator capable of causing a crosslinking reaction by effectively absorbing energy to form radicals, as an example, a compound including a benzophenone structure.

In some embodiments, the self-assembled monolayer (SAM) of the CNT film coated substrate according to an exemplary embodiment of the present disclosure may be a unit derived from a compound represented by the following Chemical Formula 11:

Chemical Formula 11

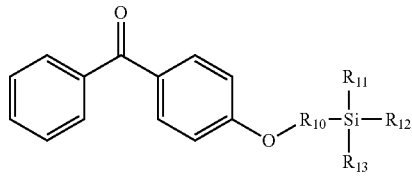

wherein $R_{10}$ is $C_{1-10}$, $R_{11}$ to $R_{13}$ are independently hydroxy, halogen, $C_{1-10}$ alkyl, $C_{1-10}$ haloalkyl, $C_{1-10}$ alkoxy, or $C_{1-10}$ alkoxycarbonyl. Specifically, $R_{10}$ may be $C_{1-7}$ alkylene, $R_{11}$ to $R_{13}$ are independently halogen, $C_{1-7}$ alkyl, or $C_{1-7}$ haloalkyl, and the halogen may be Cl or F, or Chemical Formula 11 may be represented by the following Chemical Formula 12:

Chemical Formula 12

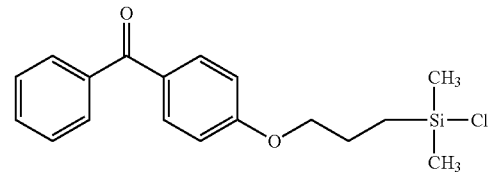

The compounds represented by Chemical Formulae 11 and 12 include a benzophenone structure to effectively absorb an energy beam, thereby reacting with an alkyl chain of a polymer in contact with electrons in an n-orbital of a carbonyl group of benzophenone. Therefore, the compounds represented by Chemical Formulae 11 and 12 and $P_1$ of Chemical Formula 2 may be crosslinked by energy beam irradiation, and the energy beam may be ultraviolet (UV).

The self-assembled monolayer may be formed by including a unit derived from the compound represented by Chemical Formula 11, and the self-assembled monolayer is crosslinked with $P_1$ of Chemical Formula 2 simultaneously with being chemically bonded to the base substrate layer, thereby fixing the $P_1$ polymer coating layer on the base substrate layer, and thus, a high-density CNT film-coated substrate to be desired in the present disclosure, which is stable to water and an organic solvent and has excellent adhesive strength with a CNT film and a substrate layer, may be manufactured.

The present disclosure provides a manufacturing method of a CNT film-coated substrate, including: a base substrate layer, a $P_1$ polymer coating layer formed on the base substrate layer, and a $P_2$ (CNT) polymer coating layer formed on the $P_1$ polymer coating layer, wherein in the $P_2$ (CNT) polymer coating layer, CNT is wrapped by a $P_2$ polymer, and the $P_1$ polymer coating layer and the $P_2$ (CNT) polymer coating layer are bonded by a triazole ring.

Specifically, the manufacturing method of a CNT film coated substrate according to an exemplary embodiment of the present disclosure may include:
(a) applying and fixing a compound represented by Chemical Formula 2 on the base substrate layer;
(b) immersing the coated base substrate layer in a $P_2$ (CNT) solution;
(c) performing a click reaction of the compound represented by Chemical Formula 2 and a compound represented by Chemical Formula 3; and
(d) after completing the reaction, washing an unreacted compound with an organic solvent:

$P_1$—$(F_1)_x$  Chemical Formula 2 wherein $F_1$ is an alkynyl functional group, and x is an integer of 1 or more,

$P_2$—$(F_2)_y$,  Chemical Formula 3 wherein $F_2$ is an azide functional group, and y is an integer of 1 or more.

Descriptions for Chemical Formulae 2 and 3 are as described above.

More specifically, in the manufacturing method of a CNT film coated substrate according to an exemplary embodiment of the present disclosure, the step (a) of applying and fixing the compound represented by Chemical Formula 2 on the base substrate layer may include:
(a-1) washing the base substrate layer with a solvent;
(a-2) applying a self-assembled monolayer (SAM);
(a-3) applying the compound represented by Chemical Formula 2;
(a-4) performing UV curing; and
(a-5) washing compounds unfixed to the substrate layer with a solvent.

In the manufacturing method of a CNT film coated substrate according to an exemplary embodiment of the present disclosure, the step (a-1) of washing the base substrate layer with a solvent may be performed for removing impurities on the surface of the base substrate layer, and the solvent may be commonly used inorganic solvent, organic solvent, or a mixture thereof. Specifically, the solvent may be those including water, acetone, methanol, ethanol, isopropyl alcohol (IPA), toluene, tetrahydrofuran (THF), and the like. More specifically, water, acetone, isopropyl alcohol (IPA), and the like may be used, a mixture thereof may be used, and, for instance, water, acetone, and isopropyl alcohol (IPA) are sequentially used to wash the base substrate layer, but the present disclosure is not limited thereto.

In the manufacturing method of a CNT film coated substrate according to an exemplary embodiment of the present disclosure, the step (a-2) of applying a self-assembled monolayer (SAM) may be performed by spin coating, dip coating, gaseous deposition, doctor blade coating, curtain coating methods, and the like. In some embodiments, it may be a dip coating method, and the dip coating method may include dipping the washed base substrate layer in a self-assembled monolayer solution for 1 to 20 hours, or dipping for 3 to 10 hours.

In addition, after completing the dipping process, the washing with one or more solvents selected from the group consisting of acetone, methanol, ethanol, isopropyl alcohol (IPA), toluene, tetrahydrofuran (THF), and the like may be performed, and, for instance, first wash with ethanol and second wash with toluene may be performed. It may be confirmed by measuring a contact angle whether the self-assembled monolayer is coated, and when the contact angle is 40° or more, the self-assembled monolayer is considered to be coated.

In the manufacturing method of a CNT film coated substrate according to an exemplary embodiment of the present disclosure, the self-assembled monolayer solution may include the compound represented by Chemical Formula 11 and a solvent, and a concentration of the compound represented by Chemical Formula 11 in the self-assembled monolayer solution may be 0.1 to 3 M, but is not particularly limited thereto. In addition, Chemical Formula 11 may be represented by Chemical Formula 12, and the descriptions for Chemical Formulae 11 and 12 are as described above.

In some embodiments, the solvent of the self-assembled monolayer solution may be a solvent which does not react with the compound represented by Chemical Formula 11, and specifically, the solvent may be one or more selected from aromatic hydrocarbons including toluene, xylene, mesitylene, and the like; cycloalkanes including cyclohexane, cycloheptane, cyclooctane, cyclononane, and the like; alkanes including hexane, heptane, octane, nonane, decane, and the like; alkylalcohol including methanol, ethanol, 1-propanol, 2-propanol, and the like; and the like, such as toluene, but it is not particularly limited as long as it is a solvent which does not react with the compound represented by Chemical Formula 11.

In the manufacturing method of a CNT film coated substrate according to an exemplary embodiment of the present disclosure, the step (a-3) of applying the compound represented by Chemical Formula 2 may be performed by one method selected from spin coating, dip coating, dropping, spray coating, solution casting, bar coating, roll coating, gravure coating, and the like, such as one method selected from spin coating, spray coating, solution casting, roll coating, and the like, but an appropriate method may be selected from the methods, depending on the characteristics of a coating solution and the use thereof. In addition, a coating solution including the compound represented by Chemical Formula 2 is prepared and applied. The coating solution may include the compound represented by Chemical Formula 2 and a solvent, and the solvent is not particularly limited as long as it dissolves the compound represented by Chemical Formula 2, but specifically, may be one or more selected from ethyl acetate (EA), toluene, acetone, 1,4-dioxane, N,N-dimethylacetamide (DMA), dimethylformamide (DMF), tetrahydrofuran (THF), chloroform, and the like, may be 1,4-dioxane or chloroform. The coating solution may include the compound represented by Chemical Formula 2 at a concentration of 0.1 to 40 mg/ml, but is not limited thereof, and the concentration may be adjusted depending on the coating thickness.

In the manufacturing method of a CNT film coated substrate according to an exemplary embodiment of the present disclosure, the compound represented by Chemical Formula 2 of the step (a-3) of applying the compound represented by Chemical Formula 2 may be represented by Chemical Formula 4. In some embodiments, Chemical Formula 4 may be represented by Chemical Formula 6, and Chemical Formula 6 may be represented by Chemical Formula 7. The descriptions for Chemical Formulae 4, 6, and 7 are as described above.

In the manufacturing method of a CNT film coated substrate according to an exemplary embodiment of the present disclosure, the step (a-4) of performing UV curing may be performed for fixing the $P_1$ polymer coating layer on the base substrate layer by crosslinking the compound represented by Chemical Formula 11 and the compound represented by Chemical Formula 2, and thus, a substrate coated with a high-density CNT film which is stable to water and an organic solvent may be manufactured. A UV curing time may be 0.1 to 30 minutes, but is not limited thereto.

In addition, the UV curing step may include forming a UV curing mask pattern using a mask having a pattern formed thereon, and forming the pattern on the substrate layer after a washing process. A CNT pattern may be formed on the base substrate layer by the process of forming a pattern, and this may be variously used in the industrial fields in which conductive materials such as a semiconductor device, a transistor, and a display are used.

In the manufacturing method of a CNT film coated substrate according to an exemplary embodiment of the present disclosure, after the UV curing step, the substrate layer may be washed with a solvent for removing an unreacted compound. The solvent may be a commonly used solvent, and is not particularly limited as long as it dissolves the unreacted compound, but may be one or more selected from toluene, acetone, 1,4-dioxane, EA, DMA, DMF, THF, chloroform, and the like.

In addition, in the manufacturing method of a CNT film coated substrate according to an exemplary embodiment of the present disclosure, the step (a) of applying and fixing the compound represented by Chemical Formula 2 on the base substrate layer may include:
 (a'-1) washing the base substrate layer with a solvent;
 (a'-2) applying the compound represented by Chemical Formula 2;
 (a'-3) performing a heat treatment; and
 (a'-4) washing compounds unfixed to the substrate layer with a solvent.

In the manufacturing method of a CNT film coated substrate according to an exemplary embodiment of the present disclosure, the step (a'-1) of washing the base substrate layer with a solvent may be performed for removing organic and inorganic pollutants remaining on the base substrate layer, and the solvent may be commonly used inorganic solvent, organic solvent, or a mixture thereof. In some embodiments, it may be one or more or a mixture thereof selected from the group consisting of water, nitric acid, sulfuric acid, hydrogen peroxide, acetone, IPA, THF, benzene, chloroform, toluene, and the like, or the base substrate layer may be first washed with a mixture of sulfuric acid and hydrogen peroxide, second washed with water, and third washed with toluene, and a weight ratio of sulfuric acid and hydrogen peroxide may satisfy 1 to 9:9 to 1, but the present disclosure is not limited thereto.

In the step (a'-2) of applying the compound represented by Chemical Formula 2 in the manufacturing method of a CNT film coated substrate according to an exemplary embodiment of the present disclosure, the compound may be applied by one method selected from spin coating, dip coating, dropping, spray coating, solution casting, bar coating, roll coating, gravure coating, and the like. In some embodiments, the coating method may be selected from spin coating, spray coating, solution casting, roll coating, and the like, but an appropriate method may be selected from the methods, depending on the characteristics of the coating solution and the use. In addition, a coating solution including the compound represented by Chemical Formula 2 is prepared and applied. The coating solution may include the compound represented by Chemical Formula 2 and a solvent, and the solvent is not particularly limited as long as it dissolves the compound represented by Chemical Formula 2, but specifically, may be one or more selected from EA, toluene, acetone, 1,4-dioxane, DMF, THF, chloroform, and the like, or may be 1,4-dioxane or chloroform. The coating solution may include the compound represented by Chemical Formula 2 at a concentration of 0.1 to 40 mg/ml, but is not limited thereof, and the concentration may be adjusted depending on the coating thickness.

In the manufacturing method of a CNT film coated substrate according to an exemplary embodiment of the present disclosure, Chemical Formula 2 in the step (a'-2) of applying the compound represented by Chemical Formula 2 may be represented by Chemical Formula 5. In some embodiments, Chemical Formula 5 may be represented by Chemical Formula 8, or Chemical Formula 8 may be represented by Chemical Formula 9. The descriptions for Chemical Formulae 5, 8, and 9 are as described above.

In the manufacturing method of a CNT film coated substrate according to an exemplary embodiment of the present disclosure, the step (a'-3) of performing a heat treatment may form the $P_1$ polymer layer on the base substrate by chemically bonding the base substrate layer to the compound represented by Chemical Formula 2. Specifically, a heat treatment temperature may be 100 to 150° C. and a heat treatment time may be 1 hour or more, but the temperature and the time may be adjusted depending on the thickness of the $P_1$ polymer layer and the like, and the ranges of temperature and time are not particularly limited as long as the physical properties to be desired in the present disclosure are not deteriorated.

After the heat treatment, the substrate layer may be washed with a solvent for removing the unreacted compound. The solvent may be a commonly used solvent, and is not particularly limited as long as it dissolves the unreacted compound, but may be one or more selected from toluene, acetone, 1,4-dioxane, EA, DMA, DMF, THF, chloroform, and the like.

The $P_2$ (CNT) solution according to an exemplary embodiment of the present disclosure may include the compound represented by Chemical Formula 3, CNT, and a solvent. Specifically, the $P_2$ (CNT) solution may be a solution in which the compound represented by Chemical Formula 3 wrapping CNT is dissolved in a solvent.

The CNT may be one or more selected from the group consisting of single-walled carbon nanotube (SWCNT), double-walled carbon nanotube, multi-walled carbon nanotube, and rope carbon nanotubes, and, for instance, may be single-walled carbon nanotube. Specifically, it may be a metallic single-walled carbon nanotube (m-SWCNT), a semiconductive single-walled carbon nanotube (sc-SWCNT), or a mixture thereof, and CNT having appropriate physical properties are selected depending on the corresponding application field to form the CNT film on the base substrate. In addition, the CNT may have an outer diameter of 0.1 nm or more, or 0.1 to 10 nm, or 0.1 to 5 nm, but it is not particularly limited as long as dispersity is not affected in the preparation of the $P_2$ (CNT) solution.

The solution of the $P_2$ (CNT) solution is not particularly limited as long as the compound represented by Chemical Formula 3 is dissolved thereon, and, for instance, a non-polar solvent may be used. A specific example of the non-polar solvent may include aromatic hydrocarbon-based solvents such as benzene, toluene, and xylene, and aliphatic hydrocarbon-based solvents such as hexane, heptane, octane, cyclohexane, and methylcyclohexane (MCH), and toluene or methylcyclohexane may be used. A polar solvent such as chloroform or tetrahydrofuran (THF) may be used, but the present disclosure is not limited thereto.

The preparation method of the $P_2$ (CNT) solution according to an exemplary embodiment of the present disclosure may include a process of dissolving the compound represented by Chemical Formula 3 in a solvent, and dispersing CNT. In some embodiments, the concentration of the compound represented by Chemical Formula 3 may be 0.1 to 30 mg/ml, or 0.1 to 20 ml/ml in the solvent, but is not limited thereto, and the concentration of CNT may be 0.05 to 5 mg/ml. Compound represented by Chemical Formula 3 may be completely dissolved in the solvent, and the compound may be dissolved in a temperature range of 50 to 100° C. Thereafter, the compound represented by Chemical Formula wrapping carbon nanotubes is separated by centrifugation, and filtration and redispersion processes are performed to prepare the solution, but the present disclosure is not limited thereto. In the redispersion process, the concentration of $P_2$ (CNT) in the $P_2$ (CNT) solution after the redispersion process may be 0.001 to 10 mg/ml, and the density of the CNT film may be adjusted by adjusting the concentration, but the present disclosure is not limited thereto. The solvent used in the redispersion process may be the same as or different from the specific example of the compound of the solvent of the $P_2$ (CNT) solution described above, and the dispersion and redispersion processes may be performed by an ultrasonic treatment, but the present disclosure is not limited thereto. When the substrate is manufactured with the $P_2$ (CNT) solution satisfying the range, a CNT film having an appropriate density may be formed on the substrate layer, and a CNT film having high stability and high density to be desired in the present disclosure may be manufactured, and the thus-prepared $P_2$ (CNT) solution may be used in the step of immersing the coated base substrate layer in the $P_2$ (CNT) solution.

In some embodiments, in the step (b) of immersing the coated base substrate layer in a $P_2$ (CNT) solution according to an exemplary embodiment of the present disclosure, the compound represented by Chemical Formula 3 of the $P_2$ (CNT) solution may be a compound represented by Chemical Formula 10, and the descriptions and the specific example of the compound are as described above.

In the manufacturing method of a CNT film coated substrate according to an exemplary embodiment of the present disclosure, the step (c) of performing a click reaction of the compound represented by Chemical Formula 2 and a compound represented by Chemical Formula 3 may be performed by heating under a copper catalyst or by an ultrasonic treatment. The $P_1$ polymer coating layer and the $P_2$ (CNT) polymer coating layer may be formed by the step, and the $P_1$ polymer coating layer and the $P_2$ (CNT) polymer coating layer may be bonded by a triazole ring. The ultrasonic treatment may be performed at an intensity of 90 to 120 W at a temperature of 50 to 60° C. under a nitrogen atmosphere, and the ultrasonic treatment time may be 1 second to 10 hours, specifically, 1 minute or more or 5 minutes to 6 hours, and more specifically, 10 minutes to 4 hours, but the temperature, the intensity, and the time are not particularly limited as long as they do not deteriorate the physical properties to be desired in the present disclosure. In addition, the reaction may be performed by variously adjusting the time for implementing a desired CNT film density even out of the range described above. The density of the CNT film may be confirmed by observing the surface of the coating layer by Raman spectroscopy, a scanning electron microscope, or an optical microscope.

In addition, a process of click reaction of the compound represented by Chemical Formula 2 and the compound represented by Chemical Formula 3 may be represented by the following Reaction Formula 1:

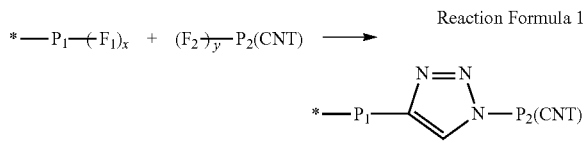

Reaction Formula 1

Reaction Formula 1 may be specifically represented by the following Reaction Formula 2:

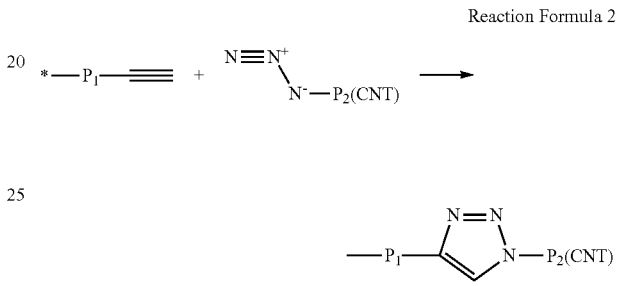

Reaction Formula 2

The descriptions for Reaction Formulae 1 and 2 are as described above.

According to an exemplary embodiment of the present disclosure, when the CNT film coated substrate is manufactured by the click reaction, a high-density CNT film may be uniformly coated within a short time, so that work is easy and efficient, and also, the substrate layer is coated with CNT film by a chemical bond to have excellent adhesive strength and secure stability to water and an organic solvent, and thus, a high-density CNT film coated substrate from which CNT is not peeled off even after washing may be manufactured.

In the manufacturing method of a CNT film coated substrate according to an exemplary embodiment of the present disclosure, the step (d) of, after completing the reaction, washing unreacted compounds with an organic solvent may be performed, and this may be performed for manufacturing a high-purity CNT film by removing unreacted compounds such as a catalyst, a monomer, and a polymer used in the reaction. The organic solvent may be used without particular limitation as long as it is a commonly used solvent, and specifically, one or more solvents selected from toluene, acetone, 1,4-dioxane, EA, DMA, DMF, THF, chloroform, and the like may be used. The washing process may be performed by ultrasonic washing, and the CNT film coated substrate according to the present disclosure maintains a high-density CNT film even after the ultrasonic washing process to secure stability to water and an organic solvent.

An acrylate copolymer represented by the following Chemical Formula 6, according to an exemplary embodiment of the present disclosure may be provided:

Chemical Formula 6

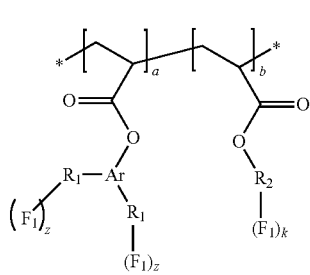

wherein Ar is a trivalent aromatic radical; $R_1$ and $R_2$ are independently of each other $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $F_1$ is an alkynyl functional group; z and k are an integer of 1 to 7; and a and b are an integer of 1 or more. The descriptions for Chemical Formula 6 are as described above.

Chemical Formula 6 may be represented by the following compounds, but is not limited thereto:

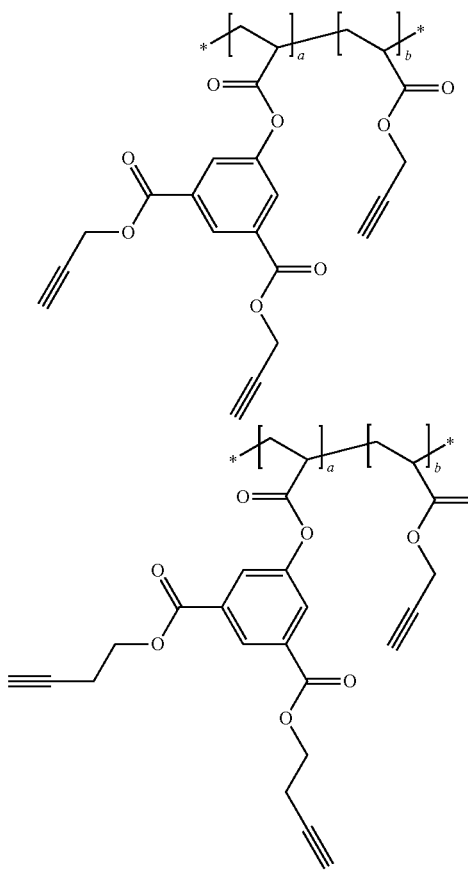

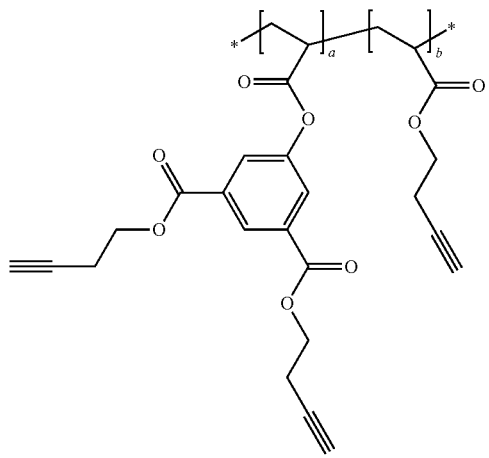

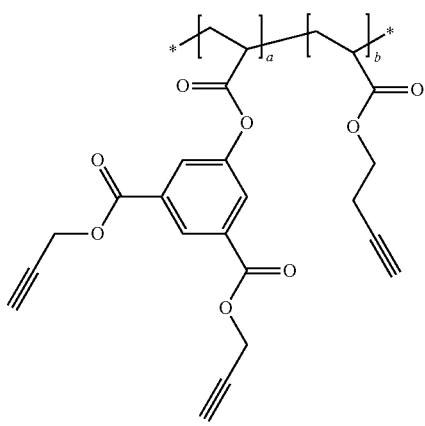

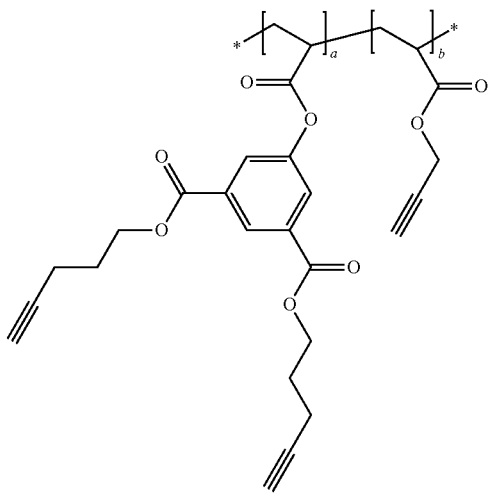

-continued

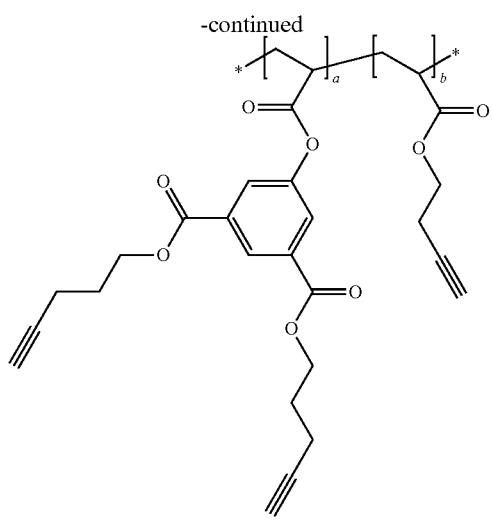

a and b of the compound are as described above for Chemical Formula 6.

The present disclosure may provide an acrylate copolymer represented by the following Chemical Formula 8, according to an exemplary embodiment of the present disclosure:

Chemical Formula 8

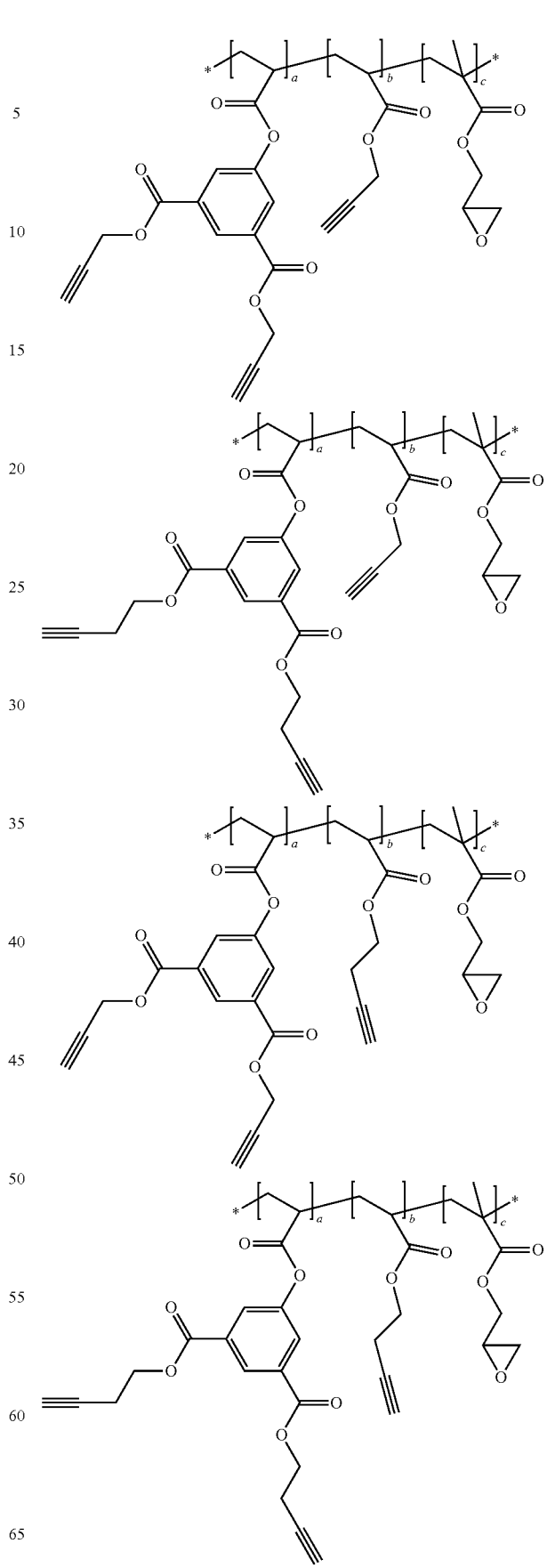

wherein Ar is a trivalent aromatic radical; $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof; the alkylene, cycloalkylene, arylene, heteroarylene, and alkoxycarbonylene may be optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$aryl$(C_{1-20})$alkyl, $C_{6-30}$ aryl, $C_{3-30}$ heteroaryl, and the like; $R_5$ is hydrogen or $C_{1-3}$ alkyl; $F_1$ is an alkynyl functional group; $F_3$ is an epoxy functional group; z, k, and t are an integer of 1 to 7; and a, b, and c are an integer of 1 or more. The descriptions for Chemical Formula 8 are as described above.

Chemical Formula 8 may be represented by the following compounds but is not limited thereto:

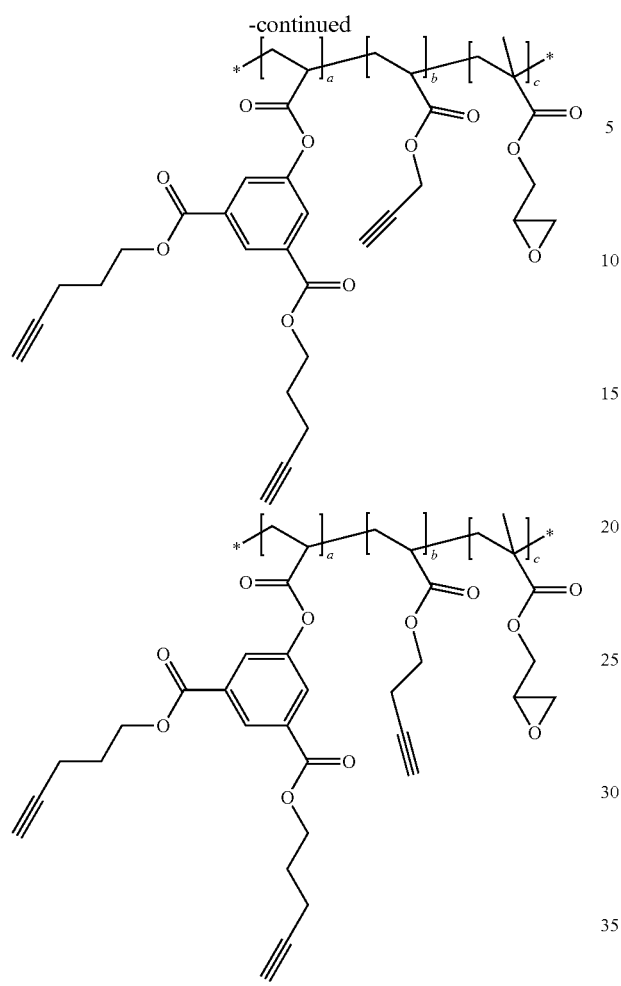

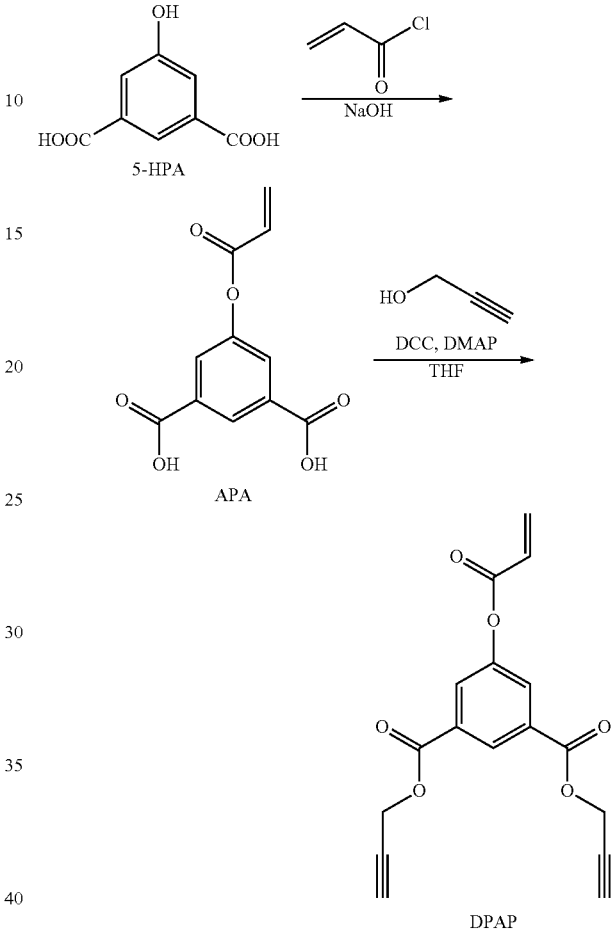

Preparation Example 1: Preparation of dipropargyl-5-acryloyloxyisophthalate (DPAP) compound a, b, and c of the compound are as described above for Chemical Formula 8.

In addition, in Chemical Formulae 6 and 8 according to an exemplary embodiment of the present disclosure, Ar may be two identical $R_1$'s linked to each other or two different $R_1$'s linked to each other. $R_1$ may include z $F_1$'s, and when two different $R_1$'s are linked to Ar, z of the two different $R_1$'s from each other may be independently an integer of 1 to 7.

Hereinafter, a high-density CNT film coated substrate using the click reaction according to the present disclosure and a manufacturing method thereof will be described in detail by the examples. However, the following exemplary embodiments are only a reference for describing the present disclosure in detail, and the present disclosure is not limited thereto, and may be implemented in various forms. In addition, unless otherwise defined, all technical terms and scientific terms have the same meanings as those commonly understood by a person skilled in the art to which the present disclosure pertains. In addition, the terms used herein are only for effectively describing certain examples, and are not intended to limit the present disclosure.

In addition, in the examples and the comparative examples, the material used of which the manufacturer is not described was purchased from Sigma-Aldrich.

Preparation of 5-acryloyloxyisophthalic acid (APA)

5.5 mmol (1 g) of 5-hydroxyisophthalic acid (5-HPA) was added to a three-neck flask filled with 10 mL of a 2 M sodium hydroxide (NaOH) solution, and nitrogen purging was performed for 10 minutes. The mixture was cooled to 0 to 5° C. and maintained at the temperature, 5.8 mmol of acryloyl chloride was added dropwise very slowly for 1 hour, and then stirring was performed at room temperature for 1 hour. HCl was added thereto to precipitate the product of 5-acryloyloxyisophthalic acid (APA). The precipitated product was filtered, washed, and recrystallized with alcohol, and then dried in vacuo at 50° C. for 24 hours to obtain APA (yield: 55%).

$^1$H NMR spectrum of APA $^1$H NMR (300 MHz, DMSO-d6) δ (ppm): 13.54 (s, 2H), 8.37 (t, J=1.5 Hz, 1H), 7.94 (d, J=1.5 Hz, 2H), 6.59 (dd, J=17.2, 1.5 Hz, 1H), 6.43 (dd, J=17.2, 10.2 Hz, 1H), 6.19 (dd, J=10.2, 1.5 Hz, 1H)

Preparation of dipropargyl-5-acryloyloxyisophthalate (DPAP)

40 mL of tetrahydrofuran (THF) and 16.34 mmol (3.86 g) of APA were prepared in a flask. 16.34 mmol (8.2 g) of propargyl alcohol and 15 mol % of 4-dimethylaminopyridine (DMAP) with respect to 100 mol of APA were added thereto. The mixture was cooled to 0 to 5° C., and stirred for 1 hour under a nitrogen atmosphere. A solution in which 24.51 mmol (5 g) of N,N'-dicyclohexylcarbodiimide (DCC) was dissolved in 30 mL of THF was added dropwise very slowly thereto, the temperature was slowly raised to room temperature, stirring was further performed for 20 hours, and the precipitate was filtered. Next, the precipitate was dissolved in chloroform and filtered again to remove residual urea. This was washed with a 10% aqueous bicarbonate solution three times and purified to obtain a target compound DPAP as white powder (yield: 29%).

$^1$H NMR, $^{13}$C NMR, and FT-IR spectra of DPAP $^1$H NMR (300 MHz, Chloroform-d) δ (ppm): 8.64 (t, J=1.5 Hz, 1H), 8.05 (d, 2H), 6.66 (m, 1H), 6.34 (m, 1H), 6.09 (m, 1H), 4.96 (d, 4H), 2.55 (t, 2H)

$^{13}$C NMR (75 MHz, Chloroform-d) δ (ppm): 164.13, 164.09, 150.77, 133.95, 131.51, 128.63, 127.92, 127.27, 77.29, 75.68, 53.17

FT-IR KBr): 1731 (ester C=O); 1630 ($CH_2$=CH—); 3305 (HC≡CH);

Preparation Example 2: Preparation of Acrylate Copolymer (i)

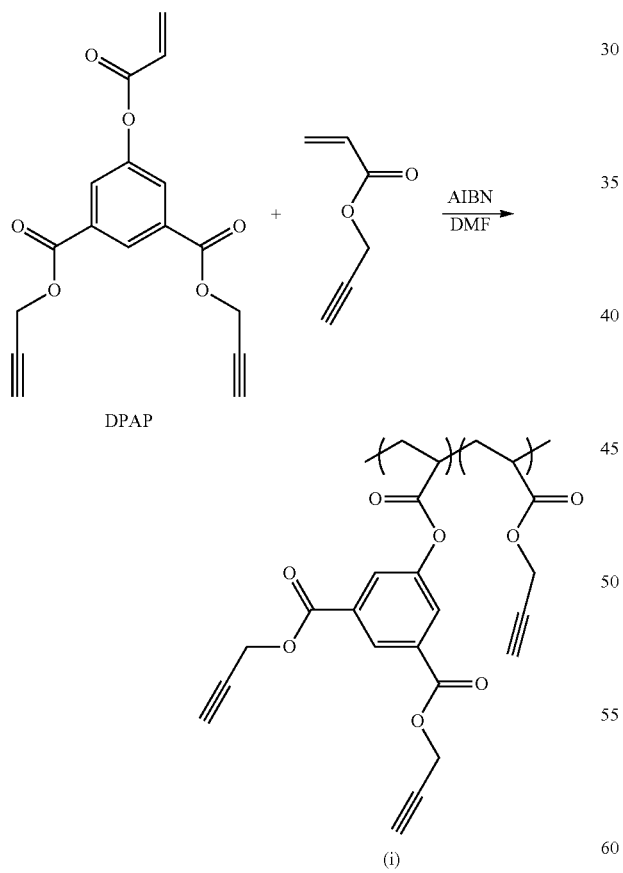

polymerization, a polymerization medium was diluted in dichloromethane, and the reactant was precipitated twice in diethyl ether and dried in vacuo to obtain an acrylate copolymer (i).

The obtained polymer was analyzed with $^1$H NMR to confirm that the target product, acrylate copolymer (i) was prepared, which was analyzed with GPC to confirm that its number average molecular weight (Mn) was 16,762 Da and PDI was 3.3.

$^1$H NMR (300 MHz, Chloroform-d) δ (ppm): 8.49 (br, 1H), 7.92 (br, 2H), 4.78 (br, 6H), 2.89 (br, 1H), 2.54 (s, 4H)

Preparation Example 3: Preparation of Acrylate Copolymer (ii)

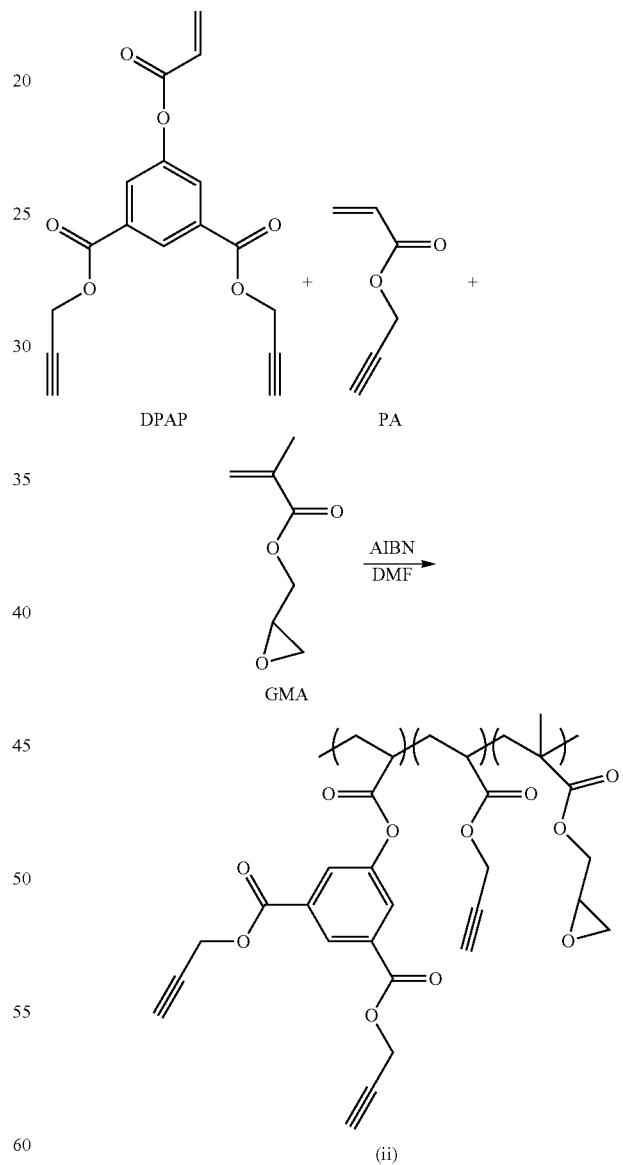

0.8 mmol (0.25 g) of DPAP, 0.8 mmol (0.088 g) of propargyl acrylate (PA), and 0.008 mmol (1.3 mg) of azobisisobutyronitrile (AIBN) were purged with nitrogen with 0.6 mL of dimethylformamide (DMF) for 20 minutes. The mixture was stirred at 80° C. for 16 hours to proceed with 0.8 mmol (0.25 g) of DPAP of Preparation Example 1, 0.8 mmol (0.088 g) of propargyl acrylate (PA), 0.4 mmol (0.057 g) of glycidyl methacrylate (GMA), and 0.001 mmol (1.6 mg) of azobisisobutyronitrile (AIBN) were added to a flask with 0.6 mL of dimethylformamide (DMF), and purging with nitrogen was performed for 20 minutes. The mixture was stirred at 80° C. for 16 hours to proceed with polymerization. A polymerization medium was diluted in dichloromethane, and the reactant was precipitated in diethyl ether twice and dried in vacuo to obtain an acrylate copolymer (ii).

The obtained polymer was analyzed with $^1$H NMR to confirm that the target product, acrylate copolymer (ii), was prepared, which was analyzed with GPC to confirm that its number average molecular weight (Mn) was 17,800 Da and PDI was 2.11.

$^1$H NMR (300 MHz, Chloroform-d) δ (ppm): 8.49 (br, 1H), 7.92 (br, 2H), 4.78 (br, 6H), 2.89 (br, 1H), 2.54 (s, 4H)

Preparation Example 4: Preparation of fluorene-based copolymer (iii)

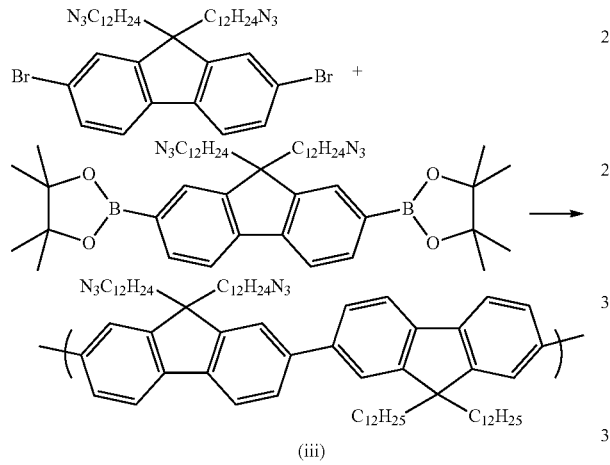

0.5 mmol (0.3774 g) of 2,2'-(9,9-didodecyl-9H-fluorene-2,7-diyl)bis(4,4,5,5-tetramethyl-1,3,2-dioxaborolane)[prepared according to the method of Macromolecules 2018, 51, 3, 755-762]), 0.5 mmol (0.3713 g) of 9,9-bis(12-azidododecyl)-2,7-dibromo-9h fluorene (Solarmer), 0.01 mmol (0.0092 g) of Pd$_3$(dba)$_2$(tris(dibenzylideneacetone)dipalladium), 0.041 mmol (0.0012 g) of tris(o-tolyl)phosphine, 8 ml of toluene, and 1 ml of tetraethylammonium hydroxide were added to a flask, and were purged with nitrogen. The mixture was heated to 80° C. and stirred for 20 hours. Precipitation and filtration were performed using chloroform and methanol to obtain a polymer (iii) in a yellow solid form (yield: 45%).

Preparation Example 5: Preparation of P$_2$ (CNT) Solution

Figure 2:
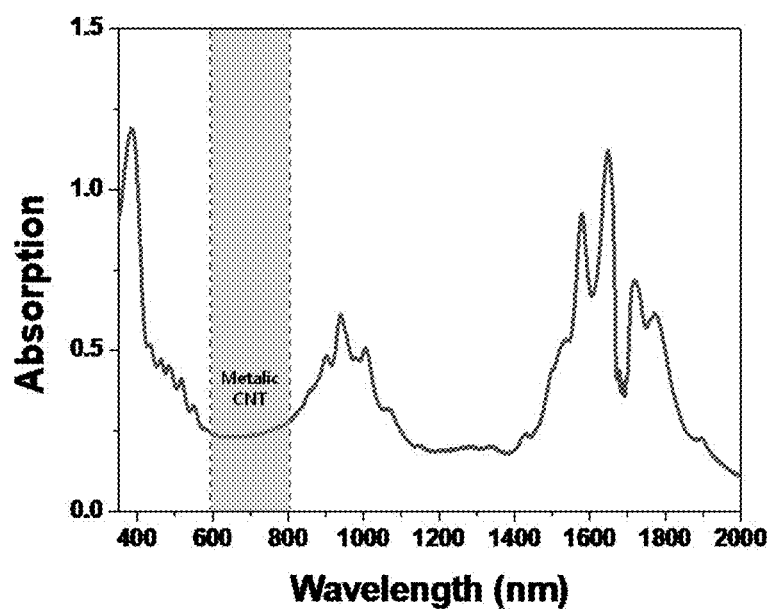
FIG. 2 is a graph showing results of UV-Vis-NIR spectroscopic analysis of the $P_2$ (CNT) solution of Preparation Example 5 according to the present disclosure.

The fluorene-based copolymer (iii) of Preparation Example 4 was added to 20 ml of methylcyclohexane (MCH) at a concentration of 1 mg/ml and heated at 80° C. for 1 hour to completely dissolve the copolymer. After cooling, 10 mg of purified powder SWCNT (Nanointegris Inc., RN-220) was added, dispersed with a sonicator (Sonics & Materials Inc., VCX-750, 750W) at room temperature, and centrifugated using a centrifuge (Hanil Scientific Inc., Supra R$_{30}$) at 85,000 g for 1 hour. A solution except precipitates was filtered with a 0.20 μm mixed cellulose ester (MCE) membrane to obtain a fluorene-based copolymer (iii) wrapping sc-SWCNT. The obtained pellet was washed several times, added to 10 ml of toluene at a concentration of 0.03 mg/ml, and sonicated and redispersed to obtain a P$_2$ (CNT) solution. A preparation process of the P$_2$ (CNT) solution is shown in FIG. 1, and the results of UV-Vis-NIR spectroscopic analysis of the prepared P$_2$ (CNT) solution are shown in FIG. 2. In FIG. 2, considering that no metallic SWCNT was shown around 600 to 800 nm, it was confirmed that sc-SWCNT (semiconductive CNT) was selectively classified.

Preparation Example 6: Preparation of self-assembled monolayer solution (BPS solution)

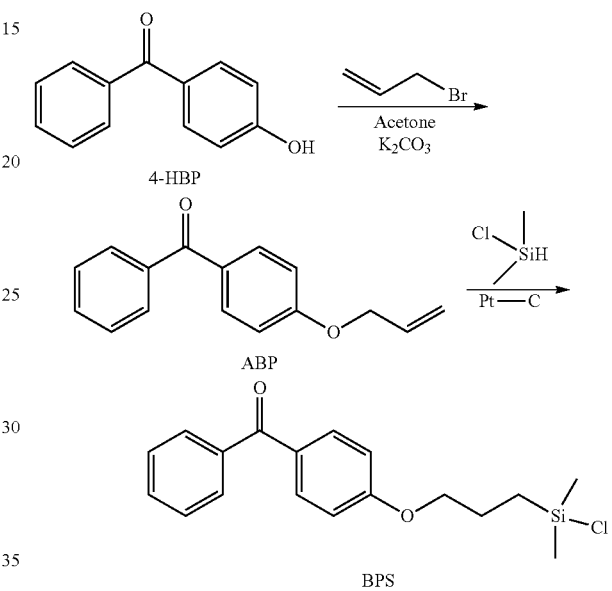

Preparation of 4-allyloxybenzophenone (ABP)

5.2 mmol (1.02 g) of 4-hydroxybenzophenone (4-HBP) and 7.8 mmol (0.945 g) of allyl bromide were dissolved in 10 mL of anhydrous acetone and 1.08 g of potassium carbonate (K$_2$CO$_3$) was added. The mixture was heated to 75° C., stirred for 8 hours, and cooled to room temperature. Water was added, and the produced solution was extracted with 50 mL of diethyl ether, washed with 50 mL of 10% NaOH twice, and dried with sodium sulfate (Na$_2$SO$_4$) to evaporate the solvent. This was recrystallized with methanol to obtain yellowish ABP (yield: 80%).

$^1$H NMR Spectrum of APP $^1$H NMR (300 MHz, Chloroform-d) δ (ppm): 7.82 (d, J=8.9 Hz, 2H), 7.78-7.72 (m, 2H), 7.60-7.53 (m, 1H), 7.50-7.44 (m, 2H), 6.98 (d, J=8.9 Hz, 2H), 6.14-6.00 (m, 1H), 5.49-5.30 (m, 2H), 4.62 (m, 2H)

Preparation of 4-(3'-Chlorodimethylsilyl)propyloxy-benzophenone(BPS) and BPS Solution 2 g of ABP and 20 mL of dimethyl chlorosilane were added to a flask and stirred to prepare a suspension. 10 mg of Pt—C (10% Pt) was added thereto, and stirring and reflux were performed at 50° C. for 8 hours. The reactant was dissolved in toluene at a concentration of 1 M, filtration was performed to remove a catalyst, and then a BPS solution which was a self-assembled monolayer solution in an oil form including a BPS compound was obtained.

¹H NMR Spectrum of BPS
¹H NMR (300 MHz, Chloroform-d) δ (ppm): 7.91 (m, 2H), 7.84 (m, 2H), 7.60 (m, 1H), 7.55-7.48 (m, 2H), 7.01 (m, 2H), 4.08-4.00 (m, 2H), 2.02-1.89 (m, 2H), 1.05-0.94 (m, 2H), 0.26-0.21 (s, 6H)

Examples 1 to 11

A 100 nm $SiO_2$ substrate layer (Chung king enterprise) was washed clean with water, acetone, and isopropyl alcohol (IPA) in that order, the washed substrate layer was immersed in the BPS solution of Preparation Example 6 and allowed to stand for 8 hours, and the substrate was washed with ethanol and toluene to coat the substrate layer with a self-assembled monolayer (SAM). The SAM coated substrate layer was spin-coated with a solution in which acrylate copolymer (i) of Preparation Example 2 was dissolved in chloroform at a concentration of 10 mg/ml under conditions of 1000 rpm, was UV-cured for 7 minutes, and was ultrasonically washed in chloroform for 1 hour to wash unfixed compounds on the substrate layer.

Figure 3:
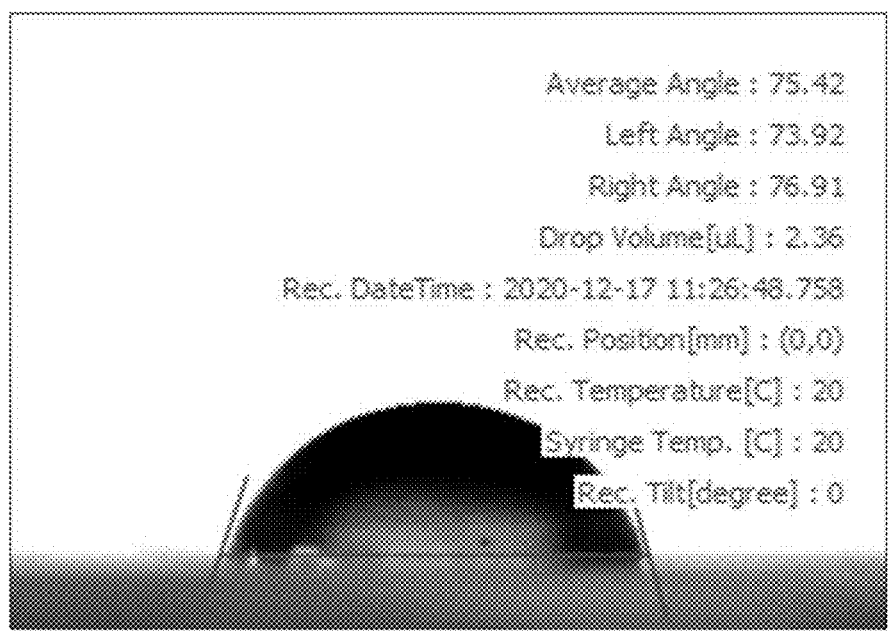
FIG. 3 is an image in which a contact angle of a coating layer is measured after coating a self-assembled monolayer (SAM) in Example 1 according to the present disclosure.
Figure 4A:
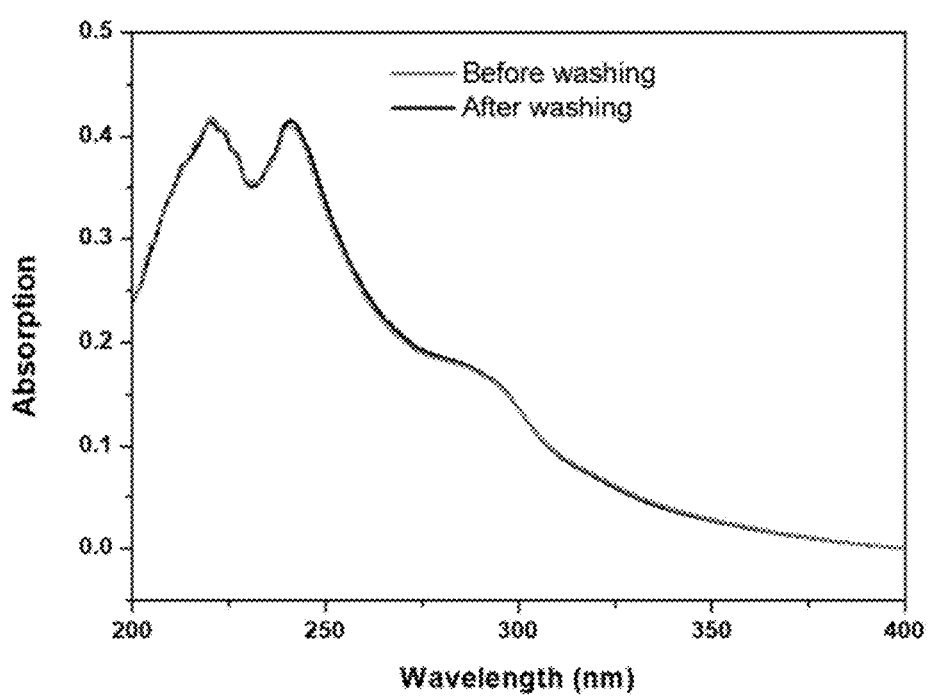
FIG. 4A is a graph showing results of UV-Vis spectroscopic analysis before and after washing with a solvent, after UV curing of an acrylate copolymer (i) solution coated in Example 1 according to the present disclosure.

As shown in FIG. 3, it was confirmed by contact angle measurement whether the self-assembled monolayer (SAM) was coated, and as shown in FIG. 4A, UV-Vis spectroscopic analysis was performed to confirm whether the acrylate copolymer (i) was coated, and specifically, the substrate layer was coated with an acrylate copolymer (i) solution and UV cured, and the results before and after washing the substrate layer with chloroform were compared.

Figure 5A:
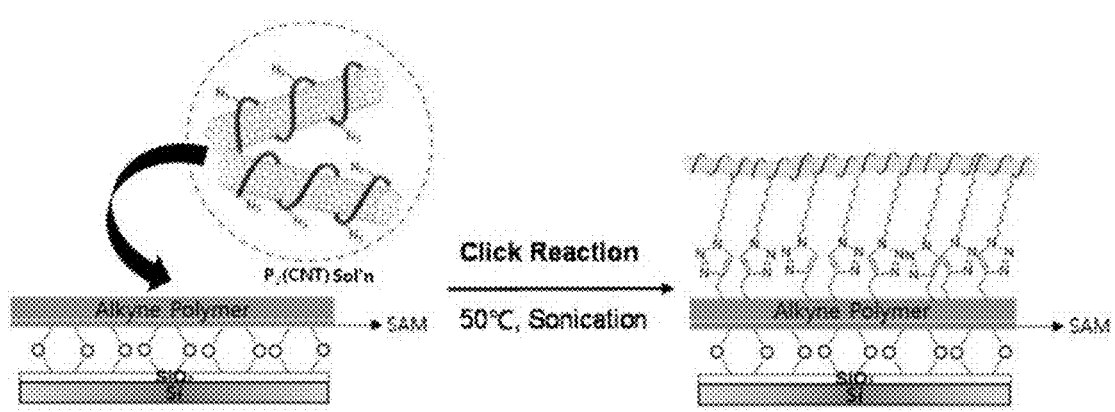
FIG. 5A is a process schematic diagram showing a click reaction process of Example 1 according to the present disclosure.

The substrate layer coated with the acrylate copolymer (i) was immersed in 1 ml of the $P_2$ (CNT) solution of Preparation Example 5, 0.003 g of copper sulfate ($CuSO_4$), 0.04 g of sodium ascorbate, and 0.5 ml of distilled water were added in a vial, and nitrogen purging was performed. The vial was dipped in an ultrasonic washer and sonicated at a temperature of 50° C. at an intensity of 110 W for 30 seconds to proceed with a click reaction. After reaction completion, ultrasonic washing in toluene was performed to remove unreacted compounds with the substrate, thereby manufacturing the CNT film coated substrate according to Example 1. A process schematic diagram of the click reaction is shown in FIG. 5A.

CNT film coated substrates were manufactured in the same manner as in Example 1, except that the ultrasonic treatment was performed for 1 minute in Example 2, two minutes in Example 3, 3 minutes in Example 4, 5 minutes in Example 5, 10 minutes in Example 6, 15 minutes in Example 7, 20 minutes in Example 8, 30 minutes in Example 9, 1 hour in Example 10, and 2 hours in Example 11 to proceed with the click reaction.

Figure 6:
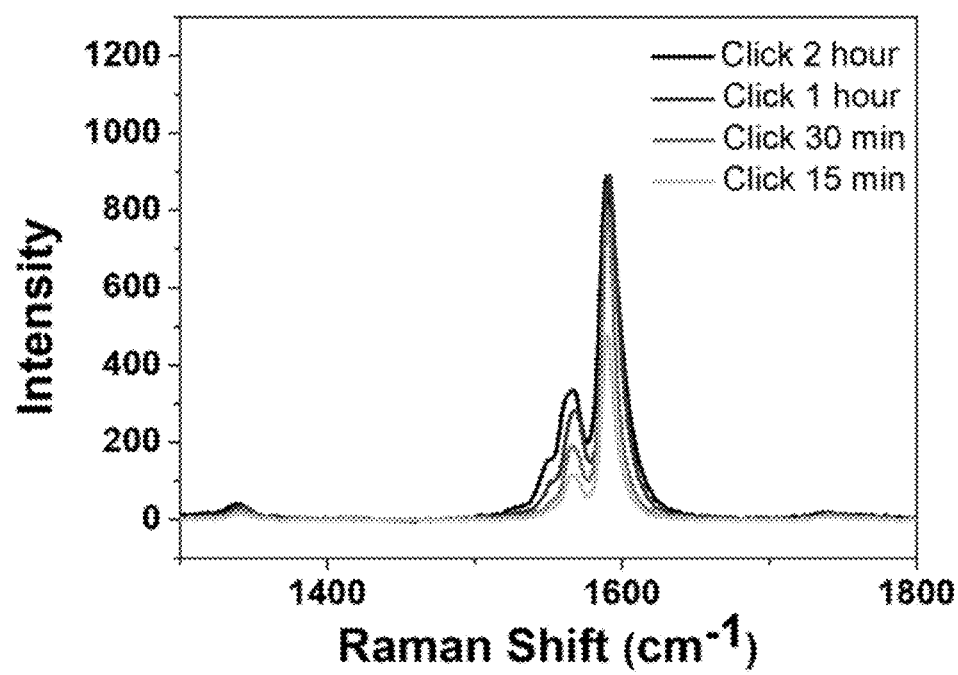
FIG. 6 is a graph showing results of Raman spectroscopic analysis of Examples 1 to 11 according to the present disclosure.
Figure 9:
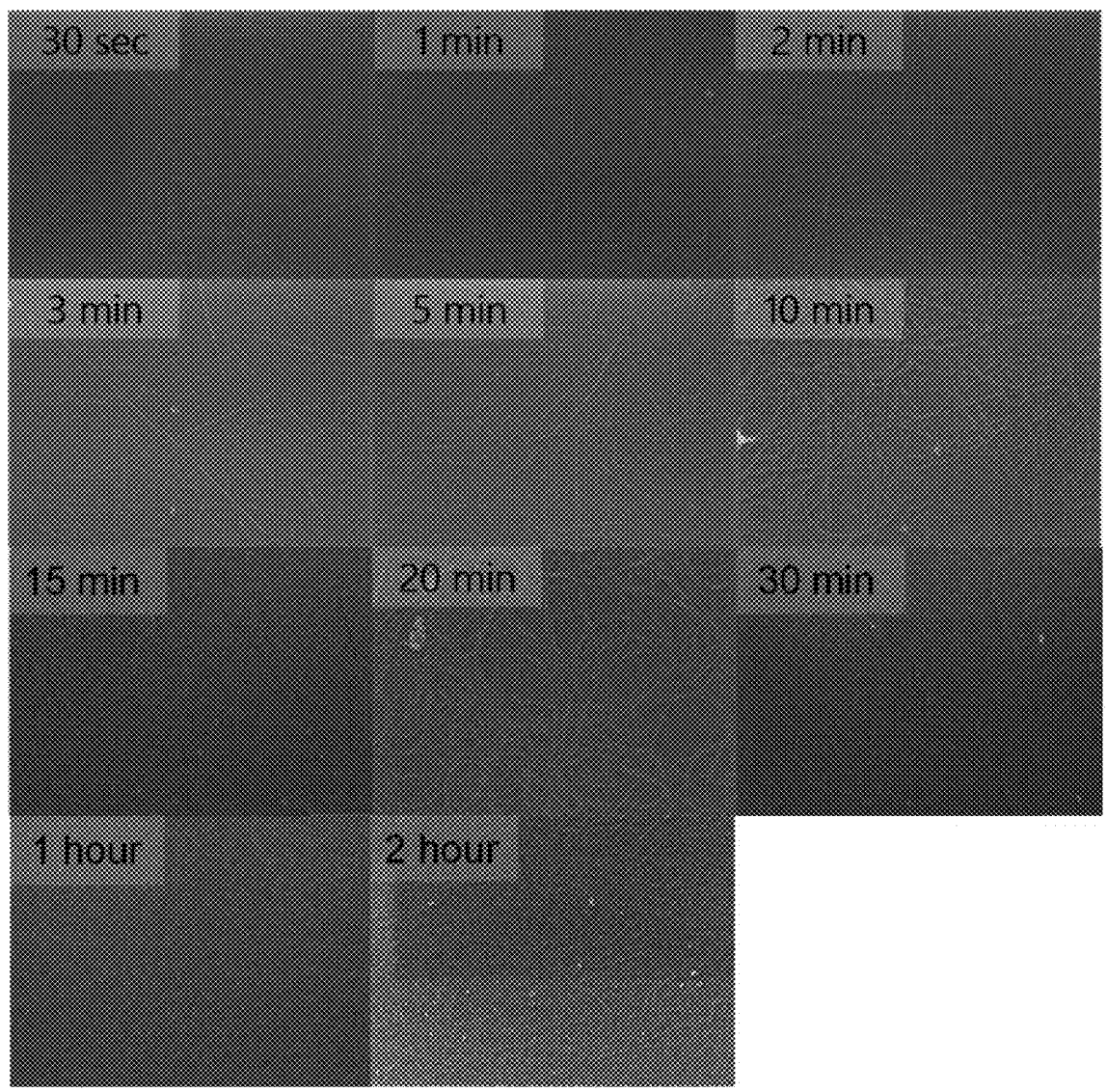
FIG. 9 is SEM images of surfaces of coating layers of Examples 1 to 11 according to the present disclosure.

In Examples 7, 9, 10, and 11, the CNT density formed on the substrate layer was confirmed by Raman spectroscopic analysis, and the results are shown in FIG. 6. In addition, the shape of the surface of the coating layer of Examples 1 and 11 was observed by a scanning electron microscope (SEM), and is shown in FIG. 9. As shown in FIGS. 6 and 9, it was confirmed that the density of the CNT film was increased as the click reaction time was longer.

FIG. 6 is a graph showing the results of Raman spectroscopic analysis of Examples 7, 9, 10, and 11 according to the present disclosure.

FIG. 9 is SEM images of surfaces of coating layers of Examples 1 to 11 according to the present disclosure.

Examples 12 to 15

A 100 nm $SiO_2$ substrate layer (Chung king enterprise) was washed clean with a solution in which sulfuric acid ($H_2SO_4$) and hydrogen peroxide ($H_2O_2$) were mixed at 7:3, and washed again with water and toluene. The substrate layer was spin coated with a solution in which the acrylate copolymer (ii) of Preparation Example 3 was dissolved in chloroform at 10 mg/ml under conditions of 1000 rpm, heat-treated at 110° C. for 2 hours, and ultrasonically washed in chloroform for 30 minutes to wash unreacted compound on the substrate layer.

Figure 4B:
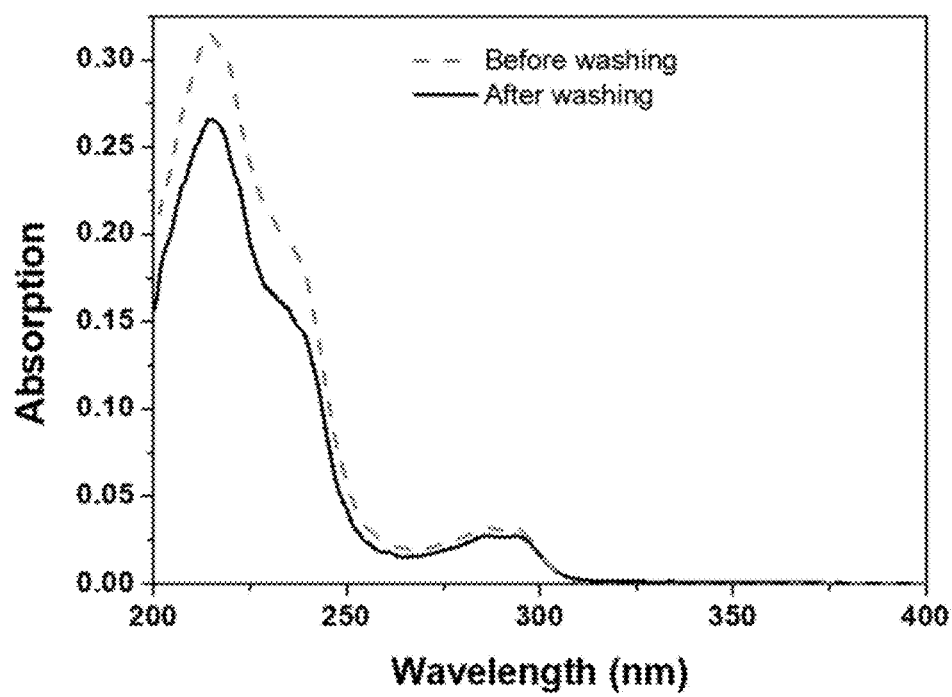
FIG. 4B is a graph showing results of UV-Vis spectroscopic analysis before and after washing with a solvent after thermal curing of an acrylate copolymer (ii) solution coated in Example 12 according to the present disclosure.

As shown in FIG. 4B, it was confirmed by UV-Vis spectroscopic analysis whether the acrylate copolymer (ii) was coated, and specifically, the acrylate copolymer (ii) solution was coated and thermally cured, and then the results before and after washing the substrate layer with chloroform were compared.

Figure 5B:
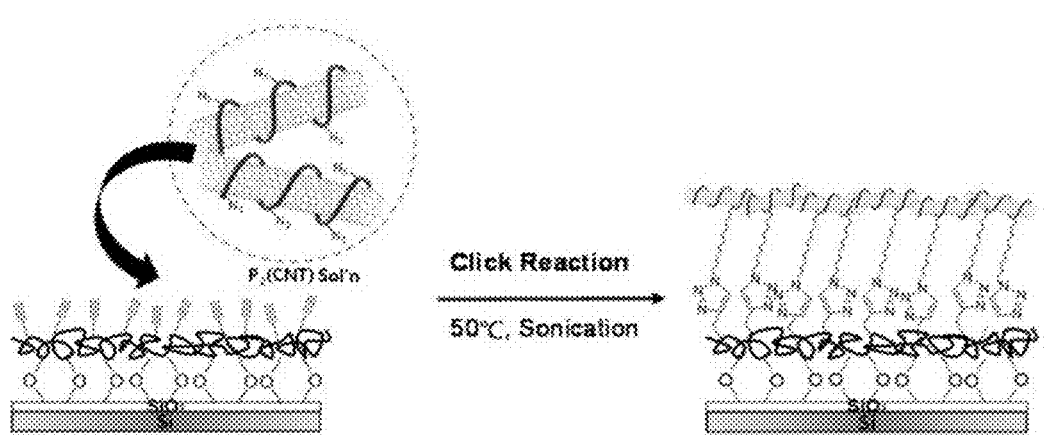
FIG. 5B is a process schematic diagram showing a click reaction process of Example 12 according to the present disclosure.

The substrate layer coated with the acrylate copolymer (ii) was immersed in 1 ml of the $P_2$ (CNT) solution of Preparation Example 5, 0.003 g of copper sulfate ($CuSO_4$), 0.04 g of sodium ascorbate, and 0.5 ml of distilled water were added in a vial, and nitrogen purging was performed. The vial was dipped in an ultrasonic washer and sonicated at a temperature of 50° C. at an intensity of 110 W for 15 minutes to proceed with a click reaction. After reaction completion, ultrasonic washing in toluene was performed to remove unreacted compounds with the substrate, thereby manufacturing the CNT film coated substrate according to Example 12. A process schematic diagram of the click reaction is shown in FIG. 5B.

A CNT film coated substrate according to Example 13 was manufactured in the same manner as in Example 12, except that the vial was sonicated for 30 minutes to proceed with the click reaction.

A CNT film coated substrate according to Example 14 was manufactured in the same manner as in Example 12, except that the vial was sonicated for 1 hour to proceed with the click reaction.

A CNT film coated substrate according to Example 15 was manufactured in the same manner as in Example 12, except that the vial was sonicated for 2 hours to proceed with the click reaction.

Figure 7:
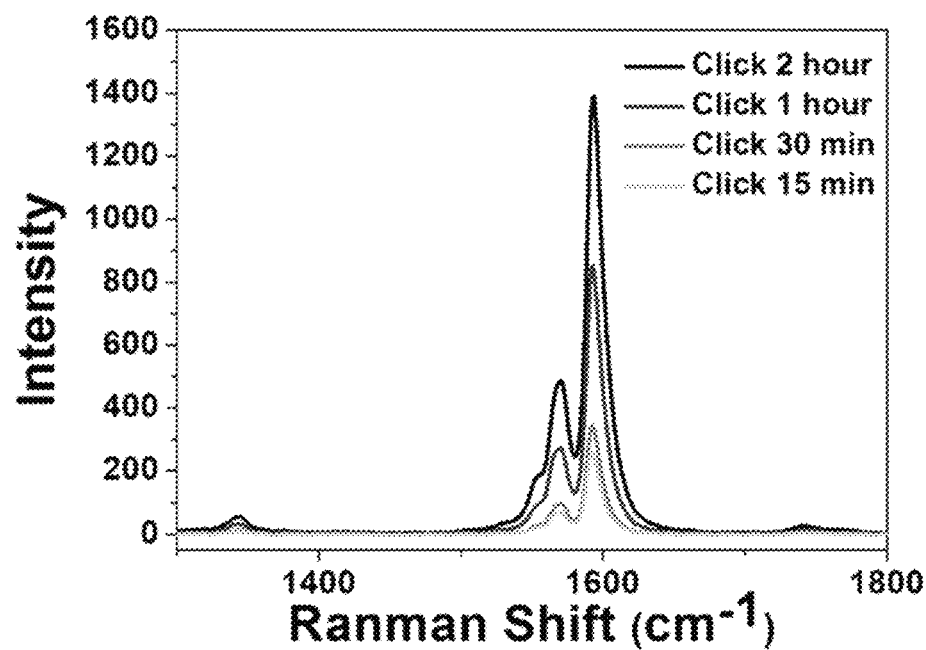
FIG. 7 is a graph showing results of Raman spectroscopic analysis of Examples 12 to 15 according to the present disclosure.
Figure 10:
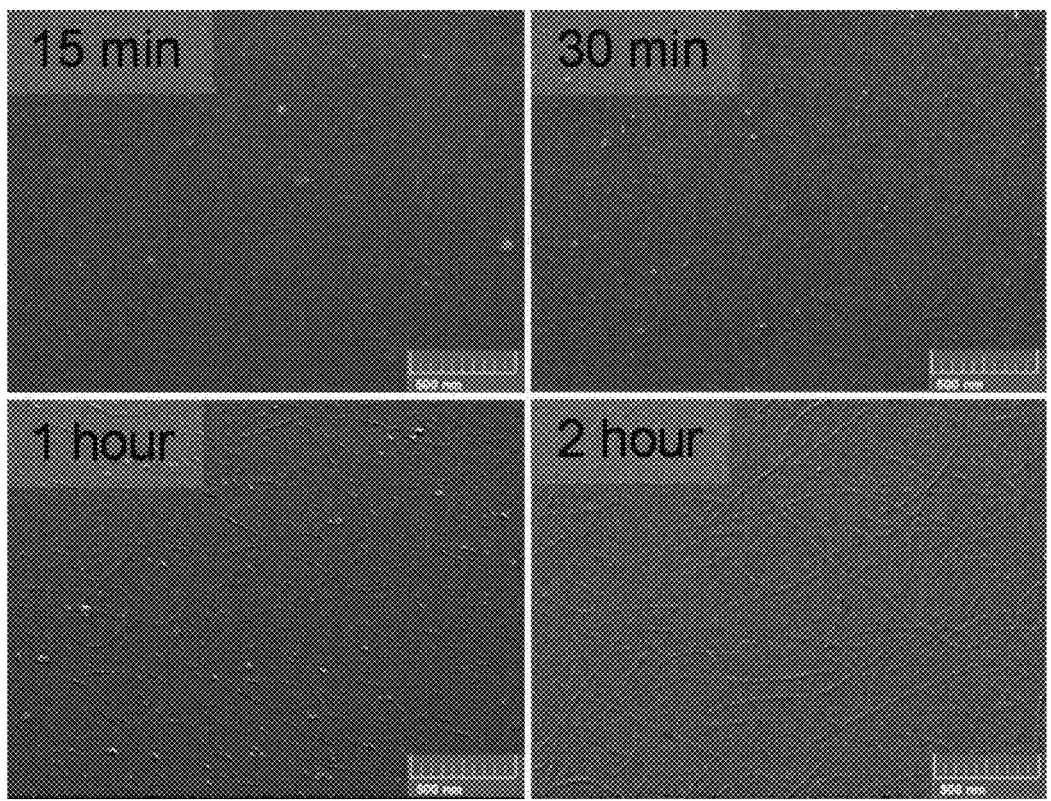
FIG. 10 is SEM images of surfaces of coating layers of Examples 12 to 15 according to the present disclosure.

In Examples 12 to 15, the CNT densities formed on the substrate layers were confirmed by Raman spectroscopic analysis, and the results are shown in FIG. 7. In addition, the shapes of the surfaces of the coating layers of Examples 12 to 15 were observed by a scanning electron microscope (SEM), and are shown in FIG. 10. As shown in FIGS. 7 and 10, it was confirmed that the density of the CNT film was increased as the click reaction time was longer.

FIG. 7 is a graph showing results of Raman spectroscopic analysis of Examples 12 to 15 according to the present disclosure.

FIG. 10 is SEM images of surfaces of coating layers of Examples 12 to 15 according to the present disclosure.

Comparative Example 1

A 100 nm $SiO_2$ substrate layer (Chung king enterprise) was washed clean with a solution in which sulfuric acid ($H_2SO_4$) and hydrogen peroxide ($H_2O_2$) were mixed at 7:3, and washed again with water and toluene. The substrate layer was spin coated with $P_2$ (CNT) solution of Preparation Example 5 under conditions of 2000 rpm, and dried on a hot plate. After the process was repeated three times to coat a film, ultrasonic washing in toluene was performed to remove unreacted compounds with the substrate, thereby manufacturing the CNT film coated substrate according to Comparative Example 1.

Figure 8A:
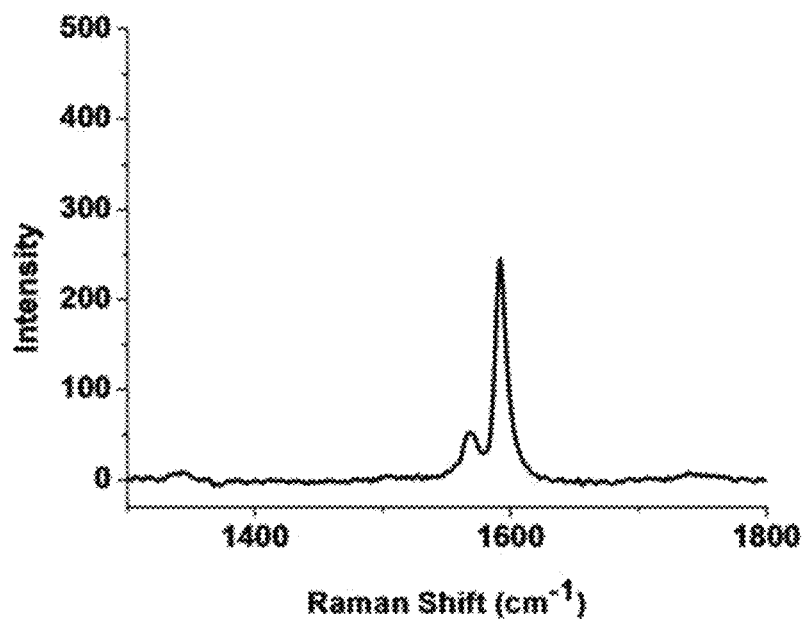
FIG. 8A is a graph showing results of Raman spectroscopic analysis of a coating layer before ultrasonic washing in Comparative Example 1.
Figure 8B:
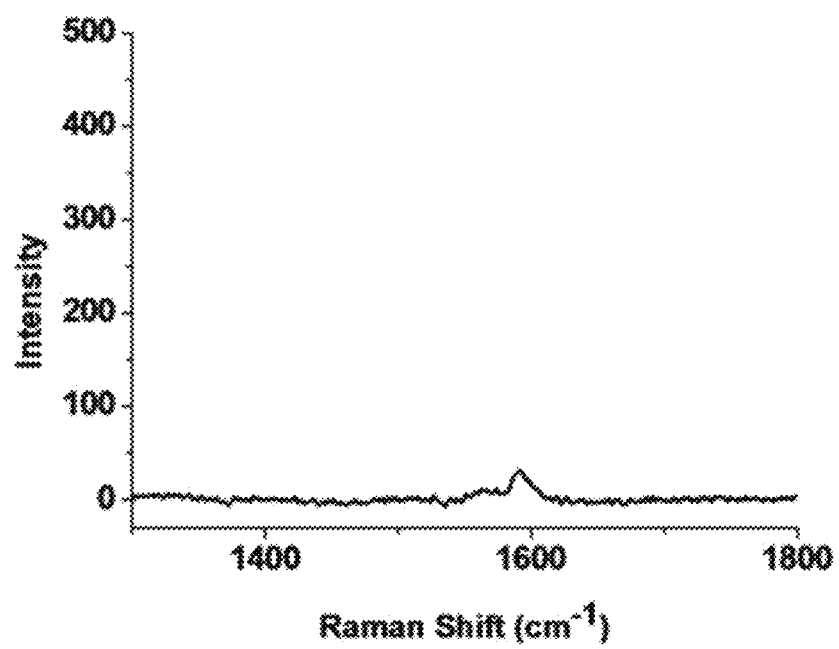
FIG. 8B is a graph showing results of Raman spectroscopic analysis of a coating layer after ultrasonic washing in Comparative Example 1.

In Comparative Example 1, the CNT density formed on the substrate layer was confirmed by Raman spectroscopic analysis, and the results are shown in FIGS. 8A and 8B. In addition, the shape of the surface of the coating layer of Comparative Example 1 was observed with a scanning electron microscope, and is shown in FIGS. 11A and 11B.

FIG. 8A is a graph showing the results of Raman spectroscopic analysis of a coating layer before ultrasonic washing in Comparative Example 1, and FIG. 8B is a graph showing the results of Raman spectroscopic analysis of the coating layer after ultrasonic washing in toluene, and it was confirmed that the Raman spectroscopic peak of the coating layer was significantly decreased after the washing.

Figure 11A:
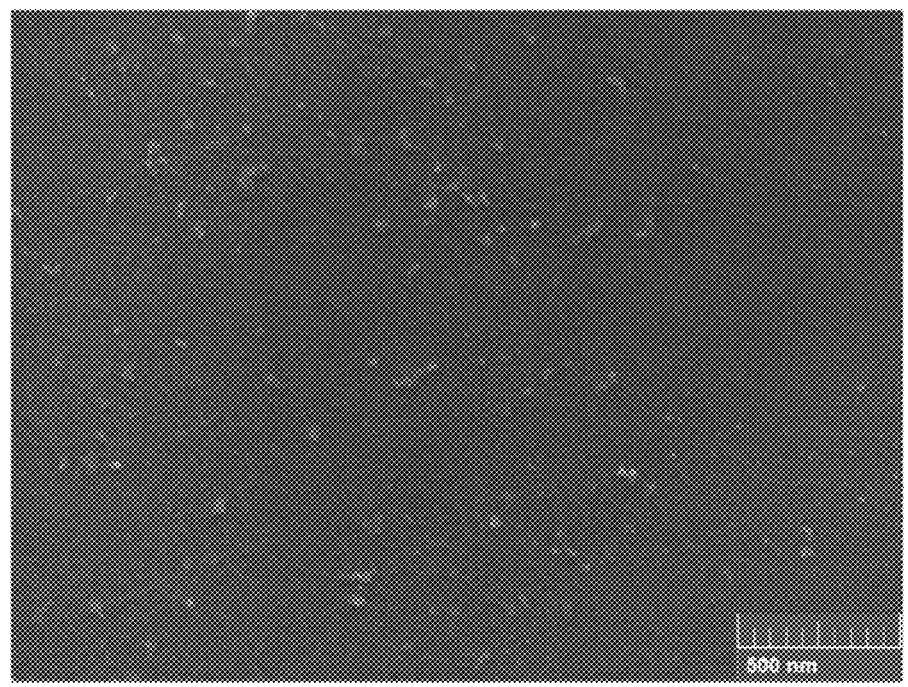
FIG. 11A is an SEM image of a surface of a coating layer before ultrasonic washing in Comparative Example 1.
Figure 11B:
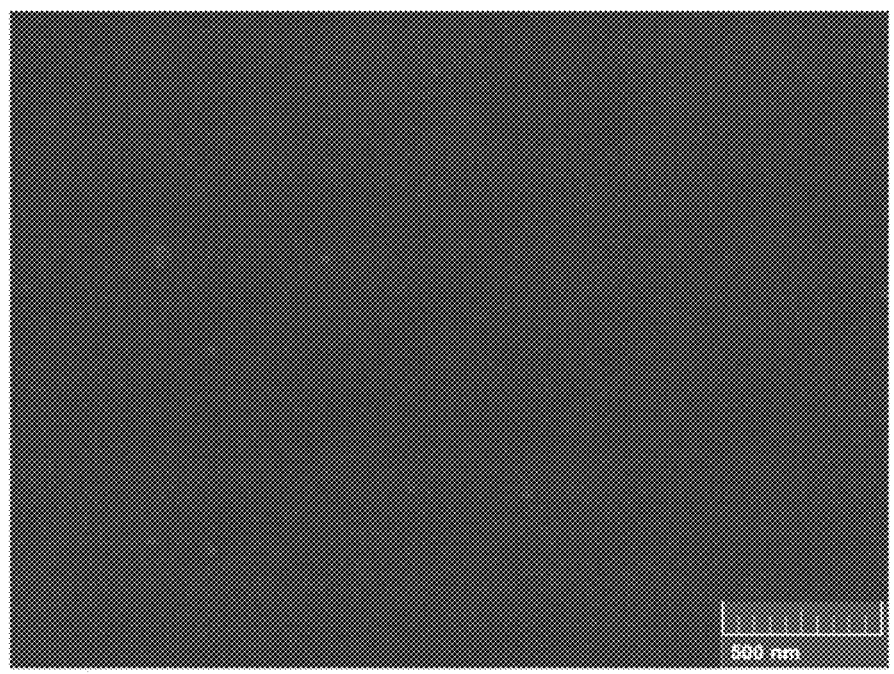
FIG. 11B is an SEM image of a surface of a coating layer after ultrasonic washing in Comparative Example 1.
Figure 12:
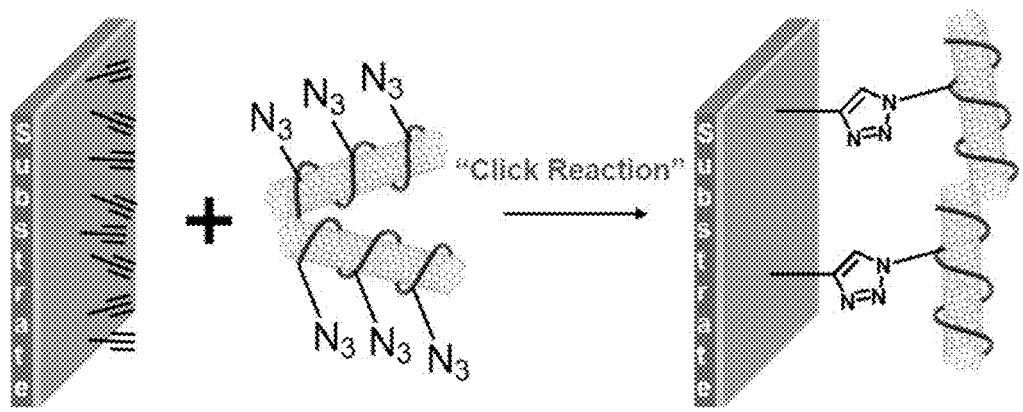
FIG. 12 is a schematic process diagram showing a process of manufacturing a CNT film using a click reaction according to an exemplary embodiment of the present disclosure.

FIG. 11A is an SEM image of a surface of the coating layer before ultrasonic washing in Comparative Example 1, and FIG. 11B is an SEM image of the surface of the coating layer after ultrasonic washing, and it was confirmed that most of the CNT film was peeled off from the surface of the coating layer after washing.

As seen from Examples 1 to 8 according to the present disclosure, it was confirmed that the adhesive strength between the substrate layer and CNT was improved by the click reaction, thereby manufacturing a high-density and uniform CNT film coated substrate. In addition, as seen from FIGS. 8A, 8B, 11A, and 11B, in Comparative Example 1 in which only spin coating was performed, most of the CNT film was peeled off after washing with toluene, but the CNT film coated substrate of an exemplary embodiment of the present disclosure maintained the high-density CNT film even after washing, and thus, the high stability to water and an organic solvent and excellent film durability of the CNT film coated substrate according to the present disclosure were confirmed.

In addition, as seen in FIGS. 6 and 7, it was confirmed that as an ultrasonic treatment time, that is, a click reaction time, was longer, the density of the CNT film was increased, and when FIGS. 6 and 7 were compared, it was confirmed that when the click reaction time was 30 minutes or more, a higher-density CNT film coated substrate was manufactured in the case of using the acrylate copolymer (ii) than in the case of using the acrylate copolymer (i) even for the same amount of time.

Hereinabove, although the present disclosure has been described by specific matters, Examples, and Comparative Examples, they have been provided only for assisting in the entire understanding of the present disclosure. Therefore, the present disclosure is not limited to the above Examples. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scope and spirit of the disclosure.

Advantageous Effects

In the CNT film coated substrate according to the present disclosure, CNT is fixed to a substrate using a click reaction, thereby uniformly forming a CNT film, having excellent adhesive strength between the CNT film and the substrate, and having high stability to water or an organic solvent. In the case of the CNT film which was previously manufactured by spray and spin coating, most of CNT was peeled off in a washing process, but in the case of the CNT film coated substrate according to the present disclosure, a high-density uniform CNT film coated substrate may be manufactured even after washing, and reproducibility between substrates may be secured.

In addition, the manufacturing method of a CNT film coated substrate according to the present disclosure may control a click reaction time to manufacture a CNT film having a desired density and may efficiently obtain a high-density CNT film with a short reaction time, and thus, a manufacturing process is convenient.

Thus, the CNT film coated substrate according to the present disclosure has excellent adhesive strength with a base material, high density, uniformity, high stability to water or an organic solvent, high reproducibility, and ease of process, and thus, may be applied to various conductive composite materials such as a semiconductor device, a display, and a transparent electrode.

The invention claimed is:

1. A manufacturing method of a CNT film coated substrate, the method comprising:
    applying and fixing a compound represented by Chemical Formula 2 on a base substrate layer;
    immersing the base substrate layer on which the compound is applied and fixed into a $P_2$ (CNT) solution;
    performing a click reaction of the compound represented by Chemical Formula 2 and a compound represented by Chemical Formula 3 to form Chemical Formula 1; and
    after completing the click reaction, washing unreacted compounds with an organic solvent,
    wherein
    the CNT film coated substrate comprises:
    the base substrate layer;
    a $P_1$ polymer coating layer formed on the base substrate layer; and
    a $P_2$ (CNT) polymer coating layer formed on the $P_1$ polymer coating layer, wherein
    in the $P_2$ (CNT) polymer coating layer, CNT is wrapped by a $P_2$ polymer, and
    the $P_1$ polymer coating layer and the $P_2$ (CNT) polymer coating layer are bonded by a triazole ring,
    the CNT of the $P_2$ (CNT) polymer coating layer includes a semiconductive single-walled carbon nanotube (sc-SWCNT),
    the CNT film coated substrate includes Chemical Formula 1:

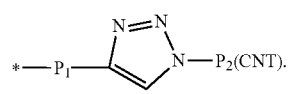

Chemical Formula 1 the $P_1$ polymer coating layer is formed from the compound represented by Chemical Formula 2:

Chemical Formula 2 wherein $F_1$ is an alkynyl functional group, and x is an integer of 1 or more, and
the $P_2$ (CNT) polymer coating layer is formed from the compound represented by Chemical Formula 3:

Chemical Formula 3 wherein $F_2$ is an azide functional group, and y is an integer of 1 or more.

2. The manufacturing method of the CNT film coated substrate of claim 1, wherein the applying and fixing of the compound represented by Chemical Formula 2 on the base substrate layer includes:
   washing the base substrate layer with a solvent;
   applying a self-assembled monolayer (SAM);
   applying the compound represented by Chemical Formula 2;
   performing UV curing; and
   washing compounds unfixed to the substrate layer with a solvent.

3. The manufacturing method of the CNT film coated substrate of claim 2, wherein in the applying of the compound represented by Chemical Formula 2, the compound represented by Chemical Formula 2 is represented by the following Chemical Formula 4:

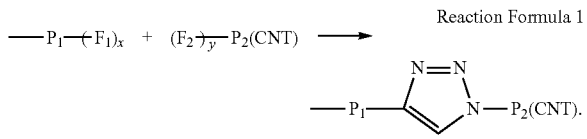

Reaction Formula 1 wherein
   $F_1$ is an alkynyl functional group;
   $p_1$ and $p_2$ are repeating units derived from a monomer having the $F_1$ functional group at the end;
   z and k are an integer of 1 to 7; and
   a and b are an integer of 1 or more.

4. The manufacturing method of the CNT film coated substrate of claim 3, wherein Chemical Formula 4 is represented by the following Chemical Formula 6:

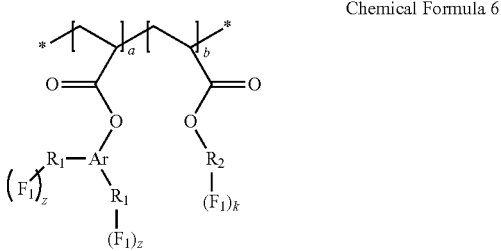

Chemical Formula 6 wherein
   Ar is a trivalent aromatic radical;
   $R_1$ and $R_2$ are independently of each other $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof;
   the alkylene, cycloalkylene, arylene, heteroarylene, and alkoxycarbonylene are optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$ aryl $(C_{1-20})$ alkyl, $C_{6-30}$ aryl, and $C_{3-30}$ heteroaryl;
   $F_1$ is an alkynyl functional group;
   z and k are an integer of 1 to 7; and
   a and b are an integer of 1 or more.

5. The manufacturing method of the CNT film coated substrate of claim 1, wherein the applying and fixing of the compound represented by Chemical Formula 2 on the base substrate layer includes:
   washing the base substrate layer with a solvent;
   applying the compound represented by Chemical Formula 2;
   performing a heat treatment; and
   washing compounds unfixed to the substrate layer with a solvent.

6. The manufacturing method of the CNT film coated substrate of claim 5, wherein the compound represented by Chemical Formula 2 is represented by the following Chemical Formula 5:

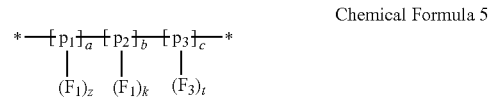

Chemical Formula 5 wherein
   $F_1$ is an alkynyl functional group;
   $F_3$ is an epoxy functional group;
   $p_1$ and $p_2$ are repeating units derived from a monomer having the $F_1$ functional group at the end;
   $p_3$ is a repeating unit derived from a monomer having the $F_3$ functional group at the end;
   z, k, and t are an integer of 1 to 7; and
   a, b, and c are an integer of 1 or more.

7. The manufacturing method of the CNT film coated substrate of claim 6, wherein Chemical Formula 5 is represented by the following Chemical Formula 8:

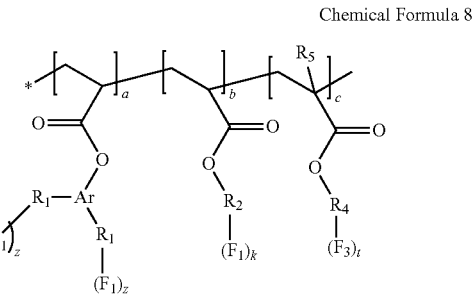

Chemical Formula 8 wherein
   Ar is a trivalent aromatic radical;
   $R_1$, $R_2$ and $R_4$ are independently of one another $C_{1-50}$ alkylene, $C_{3-50}$ cycloalkylene, $C_{6-50}$ arylene, $C_{3-50}$ heteroarylene, $C_{1-50}$ alkoxycarbonylene, or a combination thereof;
   the alkylene, cycloalkylene, arylene, heteroarylene, and alkoxycarbonylene are optionally substituted with one or more selected from hydroxy, halogen, nitro, cyano, amino, carboxyl, a carboxylic acid salt, $C_{1-20}$ alkyl, $C_{2-20}$ alkenyl, $C_{2-20}$ alkynyl, $C_{1-20}$ haloalkyl, $C_{1-20}$ alkoxy, $C_{1-20}$ alkoxycarbonyl, $C_{3-30}$ cycloalkyl, $(C_{6-30})$ aryl $(C_{1-20})$ alkyl, $C_{6-30}$ aryl, and $C_{3-30}$ heteroaryl;
   $R_5$ is hydrogen or $C_{1-3}$ alkyl;
   $F_1$ is an alkynyl functional group;
   $F_3$ is an epoxy functional group;
   z, k, and t are an integer of 1 to 7; and
   a, b, and c are an integer of 1 or more.

8. The manufacturing method of the CNT film coated substrate of claim 1, wherein in the immersing the coated base substrate layer in the $P_2$ (CNT) solution, the $P_2$ (CNT)

solution includes the compound represented by Chemical Formula 3, CNT, and a solvent.

9. The manufacturing method of the CNT film coated substrate of claim 1, wherein in the performing a click reaction of the compound represented by Chemical Formula 2 and the compound represented by Chemical Formula 3, a density of the CNT film is adjusted depending on a click reaction time.

\* \* \* \* \*